US006945289B2

(12) United States Patent
Marszalec et al.

(10) Patent No.: US 6,945,289 B2
(45) Date of Patent: Sep. 20, 2005

(54) BOTTLED WATER DISPENSER WITH SHUTOFF, VARIABLE FILTRATION CAPACITY AND REPLACEABLE CARTRIDGE FILTER

(75) Inventors: Michael S. Marszalec, Freeport, IL (US); Lowell Burnham, Freeport, IL (US); Chun-Yen Wang, Daytona Beach, FL (US); Rafael M. Rodriguez, Ormond Beach, FL (US); Nathan Snell, Mooresville, NC (US); Todd Krawczyk, Ormond Beach, FL (US); Skye V. Taylor, Anderson, SC (US); Johnnie H. Copley, Morris, IL (US)

(73) Assignee: The Clorox Company, Oakland, CA (US)

( * ) Notice: Subject to any disclaimer, the term of this patent is extended or adjusted under 35 U.S.C. 154(b) by 256 days.

(21) Appl. No.: 10/692,603

(22) Filed: Oct. 24, 2003

(65) Prior Publication Data

US 2005/0087260 A1 Apr. 28, 2005

(51) Int. Cl.[7] .................................................. B65B 1/04
(52) U.S. Cl. .................. 141/286; 141/192; 222/189.06; 210/282; 210/464; 210/469
(58) Field of Search ........................... 141/192, 85, 286, 141/364; 210/282, 464, 469, 472; 222/189.06, 189.09, 185.1, 146.6

(56) References Cited

U.S. PATENT DOCUMENTS

| | | | |
|---|---|---|---|
| 5,063,926 A | 11/1991 | Forsgren et al. | |
| 5,222,531 A | 6/1993 | Baker et al. | |
| 5,289,855 A | 3/1994 | Baker et al. | |
| 5,544,489 A | 8/1996 | Moren | |
| 5,647,416 A | 7/1997 | Desrosiers | |
| 5,674,391 A | * 10/1997 | Nohren, Jr. | ................. 210/266 |
| 5,730,863 A | 3/1998 | Howlings | |
| 5,873,995 A | 2/1999 | Huang et al. | |
| 6,224,751 B1 | 5/2001 | Hofmann | |
| 6,354,344 B1 | 3/2002 | Pluta et al. | |
| 6,561,234 B2 | 5/2003 | Pluta et al. | |

OTHER PUBLICATIONS

DaPro Rubber Inc. Website, www.daprorubber.com (Diaphragm Info, re, e.g., "Duckbill" Diaphragm), no date.
Pure Smart™ Filtered Drinking Water System, Installation & Operation, Aug. 30, 2002, www.ehydrated.com.

* cited by examiner

Primary Examiner—Steven O. Douglas
(74) Attorney, Agent, or Firm—Michael P. Mazza, LLP; R'Sue P. Caron

(57) ABSTRACT

An automatic, water dispensing, filter shutoff device having a disposable and replaceable filter. The shutoff device is in removable engagement and fluid communication with a water container such as a water bottle, and is adapted to disable dispensing after a predetermined amount of dispensing has occurred, which may but need not substantially correspond to the filtration capacity of the filter. In a preferred embodiment, the shutoff device includes a monitoring and disabling with plunger components moveable between dispensing and disabling locations, and a rotating indexing mechanism. At the disabling location, a plunger component is placed in an interfering position with the engagement between the shutoff device and the water container. The shutoff device can distinguish between water bottles having different volumetric capacities, and terminate dispensing accordingly. Preferable, a replaceable filter cartridge is provided which, when removed, causes the indexing mechanism to be reset.

16 Claims, 31 Drawing Sheets

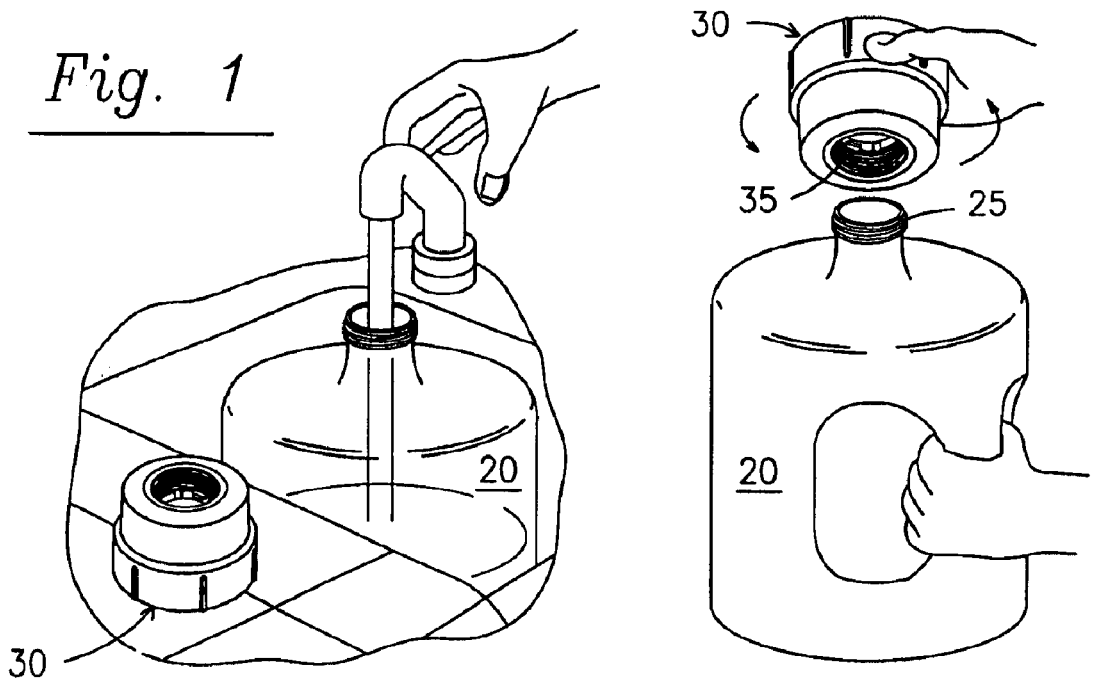
Fig. 1
Fig. 2
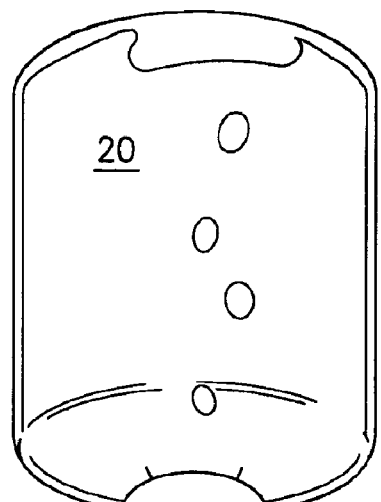
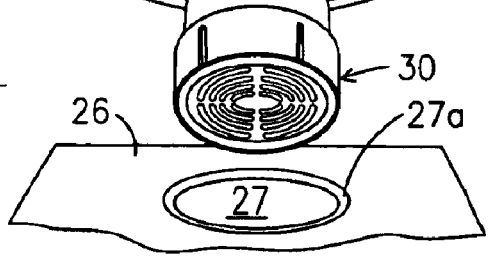
Fig. 3

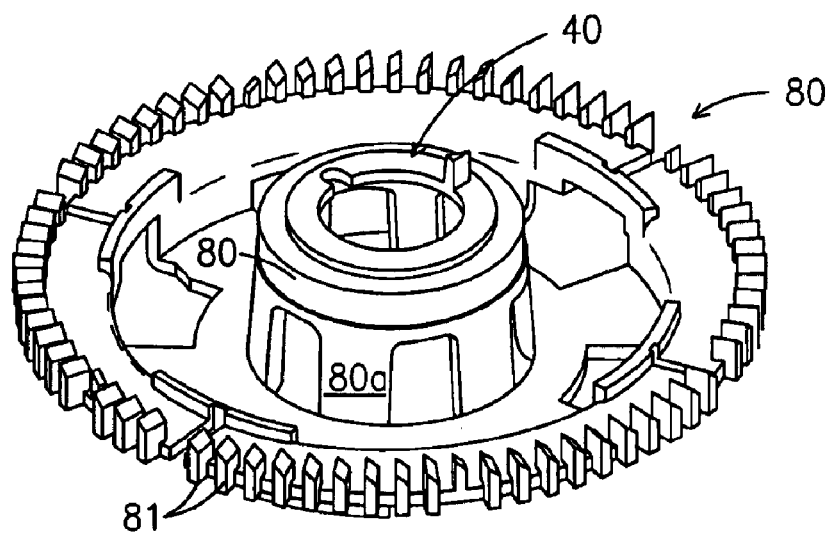
Fig. 25
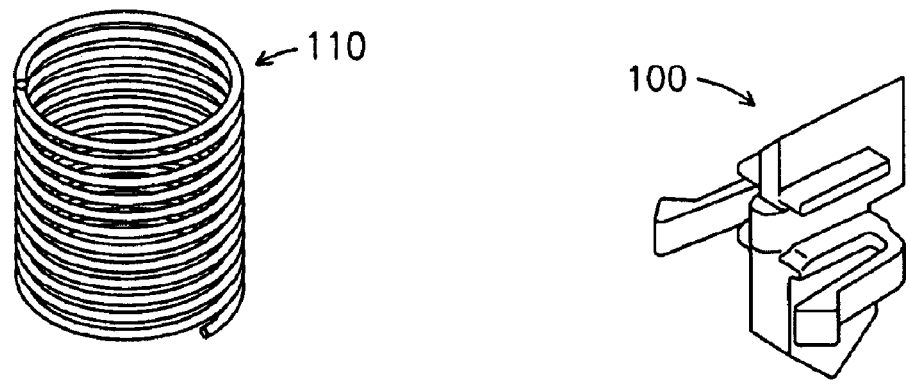
Fig. 26
Fig. 27

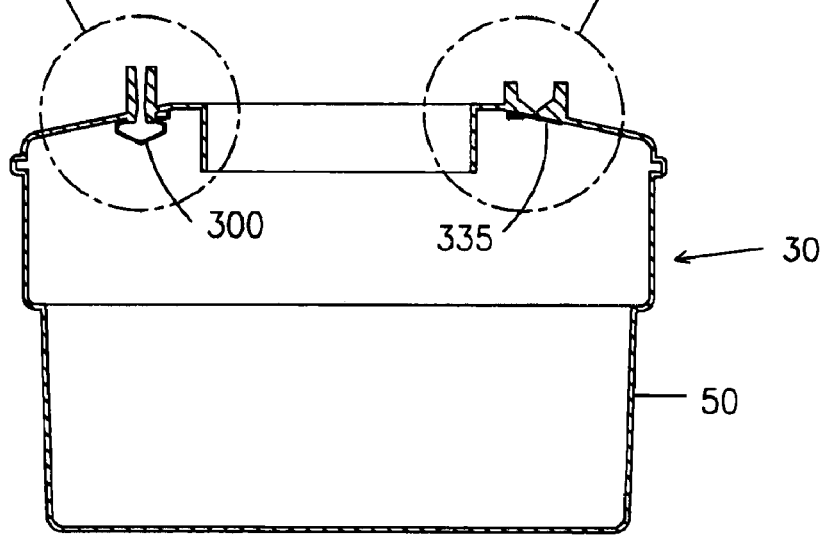
*Fig. 59*
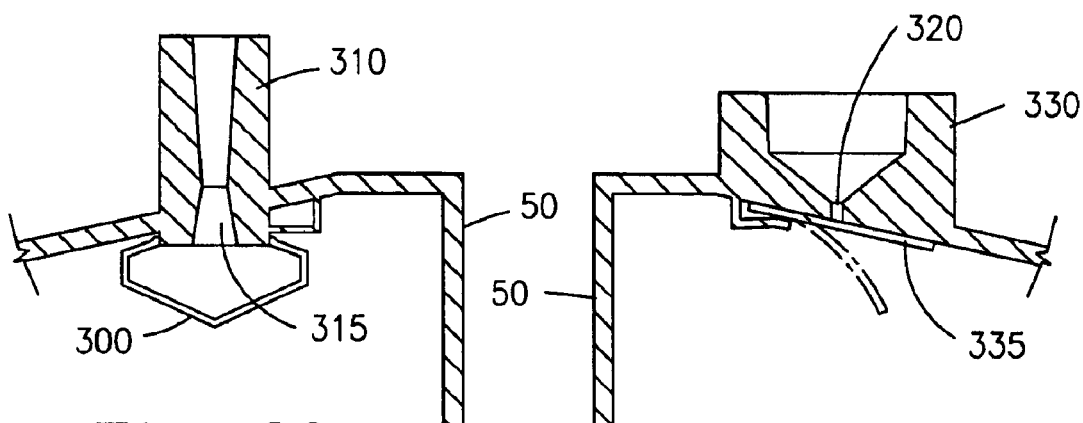
*Fig. 60*
*Fig. 61*

BOTTLED WATER DISPENSER WITH SHUTOFF, VARIABLE FILTRATION CAPACITY AND REPLACEABLE CARTRIDGE FILTER

BACKGROUND OF THE INVENTION

The present invention generally relates to the dispensing of filtered, bottled water. More specifically, the invention relates to a water dispenser that provides variable filtration capacity together with replaceable cartridge filters. The dispenser assembly of the invention monitors the number of bottles used and then disables further use of the filter when the filter has reached the end of its useful life.

Self-contained filters for removing unwanted minerals and chemicals such as chlorine have become increasingly popular with bottled water users. These filters may be threadably attached or otherwise connected to the opening of a bottled water container, or may be contained within the water dispenser unit. Various devices are also known for monitoring water flow and then interrupting water flow after a predetermined use.

Prior art devices are briefly discussed in the backround section of assignee's own U.S. Pat. Nos. 6,354,344 and 6,561,234, each of which are incorporated by reference hereto in their entirety. As discussed there it is desirable to provide an economical self-contained dispenser shutoff and filter cartridge which may be easily replaced when a monitor indicates that the filter has reached the end of its useful life. In general, prior art patents and known water dispensing disabling devices (herein termed "shutoff devices") with a filter have tended to concentrate on ways of interrupting water flow through the bottle opening once the filter has reached the end of its useful life, by physically blocking water flow. However, this may result in an interruption in dispensing when the water container still has a substantial volume of water in it. Some prior devices have required a separate filter monitor device. Shutoff devices have also tended to have a number of moving parts, increasing the risk of part malfunction.

U.S. Pat. Nos. 6,354,344 and 6,561,234 provide solutions to these problems. The inventions disclosed here are believed to provide several improvements to the technology disclosed in these prior patents, which will be apparent from the disclosure below. For example, the counting and disabling mechanism is improved as to both function and structure. In addition to providing enhanced functions, including the ability to sense variable volumetric capacity, instead of one piece having opposing teeth, which has been found difficult to mold, a two-piece design which is easier to tool is provided, and which also provides enhanced quality control. A replaceable cartridge designed to work in sequence with the disabling mechanism is also provided, along with other improvements discussed below.

Accordingly, there is a need for a water filter shutoff device which monitors water usage and automatically disables dispensing when the filter has reached the end of its useful life, without the need to rely on visual or audible warning signals. Given space and economic constraints, an improved shutoff device would preferably be integral with the filter, and would not unduly impede flow through the filter. The shutoff device would also preferably allow presetting at the time of manufacture to change the allowable water flow or application uses, so that the device could be used with differently rated filters and differently sized water containers. The device should be economical to manufacture, providing reduced tooling costs and enhanced quality control, while also being relatively simple in design with few moving parts. The shutoff device would also preferably disable dispensing, without interrupting water flow from the currently used water container, when a monitor indicates the useful life of the filter is over. An improved filter shutoff device would also preferably meet NSF criteria, including qualifying as a filter "performance indication device" (PID) under NSF standards, and include component materials that have existing NSF approval for extraction.

Filter shutoff devices must also be provided with venting in some manner to allow continuous water flow, without "lock up". One problem with such devices is that, upon initial use, as water from the inverted water bottle flows into the device, water pressure/water hammer conditions may cause unfiltered water to leak or spurt out of the venting channels and into the dispensing unit. A sufficient volume of water may escape filtration in this manner, such that the device may not receive NSF approval for, e.g., lead testing. It is also desirable to provide a filter shutoff device which overcomes this problem.

Accordingly, an object of the present invention is to provide a shutoff device integral with a filter and useable with a water dispenser, in which the water dispenser is automatically disabled at the end of the useful life of the filter.

Another object of the invention is providing a device with the ability to differentiate between dissimilar reservoir volumes and supply a constant effluent capacity.

Still another object of the invention is to provide a filter shutoff device which does not impede or interrupt water flow between the water dispensing device and a water source such as an inverted water bottle.

A further object is to provide such a device that qualifies as a filter PID under NSF standards. Yet another object is to provide a filter shutoff device which may be manufactured in an economical manner, such that the device monitors the number of water containers used, disables further dispensing after a predetermined number of uses, and then may be discarded and replaced with a new device.

A further object is to provide a filter shutoff device which automatically disables the connection between the device and a water container, rather than simply providing a visual indication of end of filter life, and rather than maintaining the ability to make this connection and physically impeding or interrupting water flow.

Yet another object is to provide a replaceable filter cartridge for the dispensing assembly.

Another object is to provide a device which may be manufactured for reduced tooling costs while enhancing quality control issues.

A still further object is to provide such a device with an appropriate size and configuration, together with appropriately located and sized vent holes, to ensure that any substantial amount of unfiltered water does not leak out of the device and be dispensed.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Automatic indexing-reset mechanism" means a mechanism which causes the indexer to be reset automatically upon changing a water container, e.g., a water bottle.

"Automatic filter shutoff device" means a device in fluid communication with a water container which filters water and then interferes with the ability to dispense water from the container after a predetermined amount of water usage (i.e., the "shutoff" feature), which may but need not generally correspond to the useable life of the filter, has been reached. "Automatic" in this context means that shutoff occurs without the need for user acknowledgment of the need for filter replacement and intervention, such as without the need for the user to respond to a visual or audible signal from a filter monitor.

"Monitoring and disabling apparatus" means an apparatus which monitors filter life by monitoring water dispensed, and which includes a shutoff feature.

"Semi-automatic cartridge-eject mechanism" means a mechanism which provides an indication to a user, via either visible and/or tactile feedback, that the filtration capacity of a filter has been depleted and that the filter cartridge should be discarded and replaced with a new filter cartridge.

SUMMARY OF THE INVENTION

The objects mentioned above, as well as other objects, are solved by the present invention, which overcomes disadvantages of prior water dispensers, while providing new advantages not believed associated with such devices.

In one preferred embodiment, an automatic, water dispensing, filter shutoff device is provided. The shutoff device includes a replaceable and disposable filter. The shutoff device is in removable engagement and fluid communication with a water container, such as a water bottle. The shutoff device is also adapted to disable dispensing after a predetermined amount of dispensing has occurred, which may but need not substantially correspond to the filtration capacity of the filter. The shutoff device may include a monitoring and disabling apparatus having a shutoff mechanism moveable between dispensing and disabling locations. In the disabling location, the shutoff apparatus is placed in an interfering position with the engagement between the shutoff device and the water container. In the preferred embodiment, the shutoff mechanism is able to automatically move into the interfering position once the predetermined amount of dispensing has occurred, and without interrupting dispensing from an engaged water container. Accordingly, the used filter may first be removed and replaced with a new filter prior to reestablishing engagement and fluid communication between the shutoff device and a new water container.

In a particularly preferred embodiment, the filter shutoff device is capable of distinguishing between water containers having different volumetric capacities, and of moving the shutoff mechanism to the disabling location once the filtration capacity has been met, despite engagement of the device to differently-sized water containers. The shutoff device may also provide tactile and/or visual feedback to a user that filter replacement should occur.

In one embodiment, the shutoff mechanism includes a plunger whose vertical height may be varied to obstruct engagement between the shutoff device and a water container. The plunger may also include plunger teeth located about an outer periphery of the plunger, as well as downwardly extending plunger teeth. In another embodiment, the monitoring and disabling apparatus may include an indexing ring carrying indexing teeth. The indexing ring may rotate as successive water bottles are used, with each incremental rotation corresponding to a single water bottle usage. The number of indexing teeth may be chosen to correspond with the predetermined amount of dispensing, given volumetric capacity of the water container. When a used water bottle is removed from engagement with the shutoff device, an automatic indexing-reset mechanism may be used to allow the indexing ring to be reset to an initial rotation position.

The indexing ring may also include, or communicate with, a retractable tooth for use in distinguishing differently-sized water containers.

In a preferred embodiment, the filter includes filter media such as a carbon-loaded, non-woven media as the primary filtering mechanism. Preferably, the filter is a replaceable filter cartridge that is automatically ejected once the predetermined amount of dispensing has occurred.

The shutoff device may include a valve mechanism, such as two or more valves, allowing air to enter the shutoff device during water dispensing, and preventing water from exiting the filter during engagement of a water container to the shutoff device.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings. The drawings illustrate currently preferred embodiments of the present invention. As further explained below, it will be understood that other embodiments, not shown in the drawings, also fall within the spirit and scope of the invention.

FIG. 1 is a perspective view of a water bottle being filled, together with one preferred embodiment of a filter shutoff device according to the present invention;

FIG. 2 is a perspective view showing a threaded connection between a preferred embodiment of a filter shutoff device of the present invention and a water bottle;

FIG. 3 is a perspective view showing a filter shutoff device, now engaged to the water bottle, just prior to seating onto the upper housing of a water dispenser according to the present invention;

FIG. 25 is a top and side perspective view of a preferred indexing ring according to the present invention;

FIGS. 26–28 show perspective views of a spring, retractable tooth and filter media, respectively, useable with the present invention;

FIG. 59 is a sectional view of the filter shutoff/replaceable cartridge mechanism, showing two preferred valves;

FIG. 60 is an enlarged view of the left-side valve shown in FIG. 59;

FIG. 61 is an enlarged view of the right-side valve shown in FIG. 59;

DETAILED DESCRIPTION OF THE PREFERRED EMBODIMENTS

Figure 4:
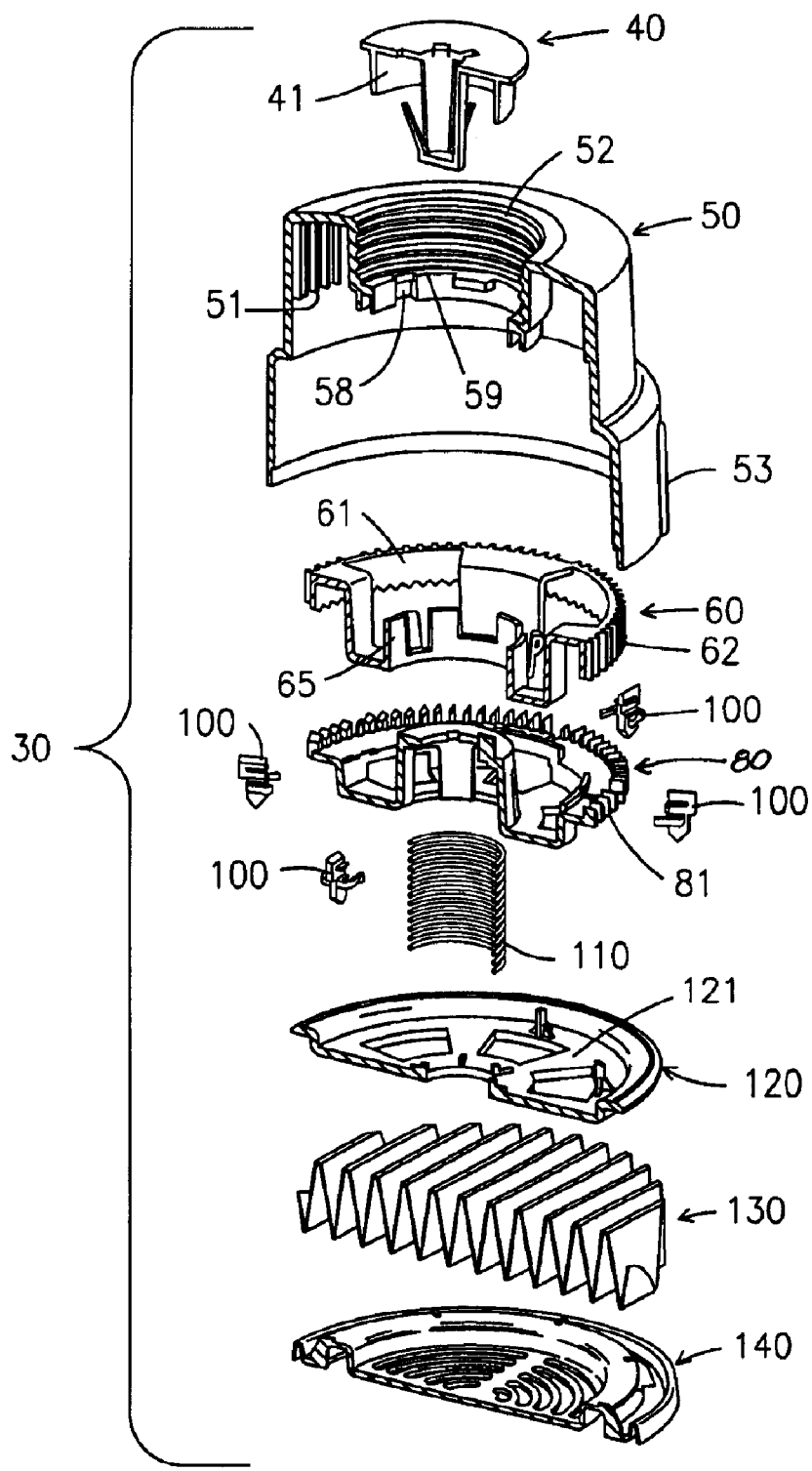
FIG. 4 is a perspective, exploded view showing various components of a preferred filter shutoff device according to the present invention.
Figure 5:
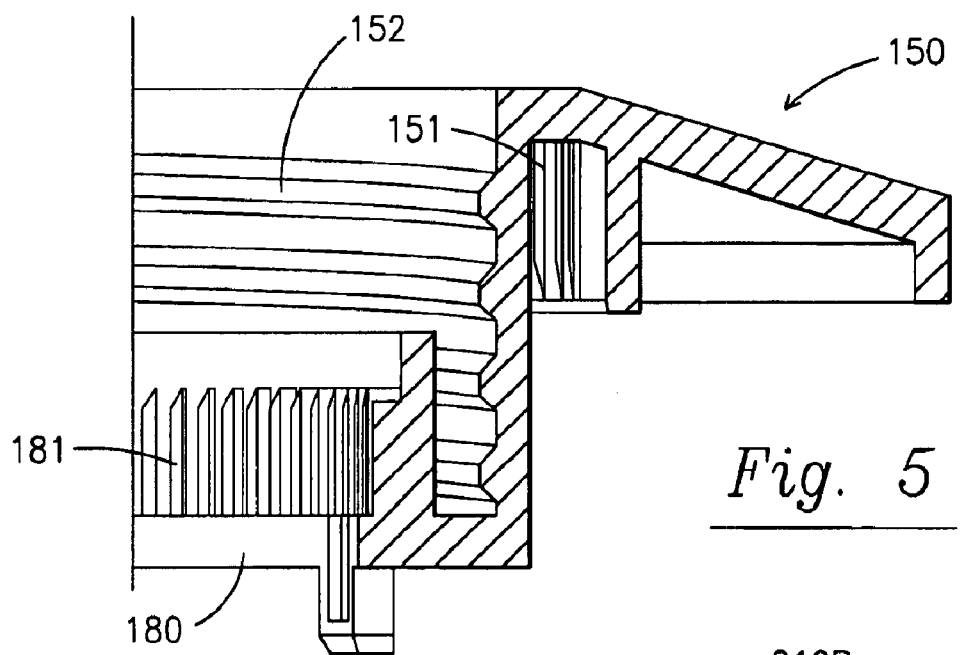
FIG. 5 is a partial cross-sectional view of a preferred embodiment of the filter shutoff device of the present invention.

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

In the following description, all clockwise directions assume a view from above.

Referring first to FIGS. 1–3, a water container such as water bottle 20 is shown, together with a preferred embodiment of the filter shutoff device of the present invention, generally referred to as 30. While it is preferred that water bottle 20 have threads 35 that allow threaded connection with mating threads 25 on the neck of water bottle 20, a threaded connection is not required.

Referring to FIG. 3, filter shutoff device 30 is sized and shaped to permit its placement within opening 27 of water cooler housing 26. (The particular water dispenser chosen for use is of little importance to the present invention.) For example, a lower portion of filter device 30 may rest on the top peripheral wall 27a of water cooler housing opening 27.

Referring now to FIGS. 4, one preferred embodiment of filter shutoff device 30 includes the following components, from top to bottom: interface 40, lid 50, plunger 60, indexing ring 80, retractable tooth 100, spring 110, spring retainer 120, filter media 130 and media cap 140. Spring retainer 120 may be ultrasonically welded to the inner periphery of the lower edge of lid 50, maintaining spring 110 under compression so that these components are maintained in place, as further explained below.

Figure 19:
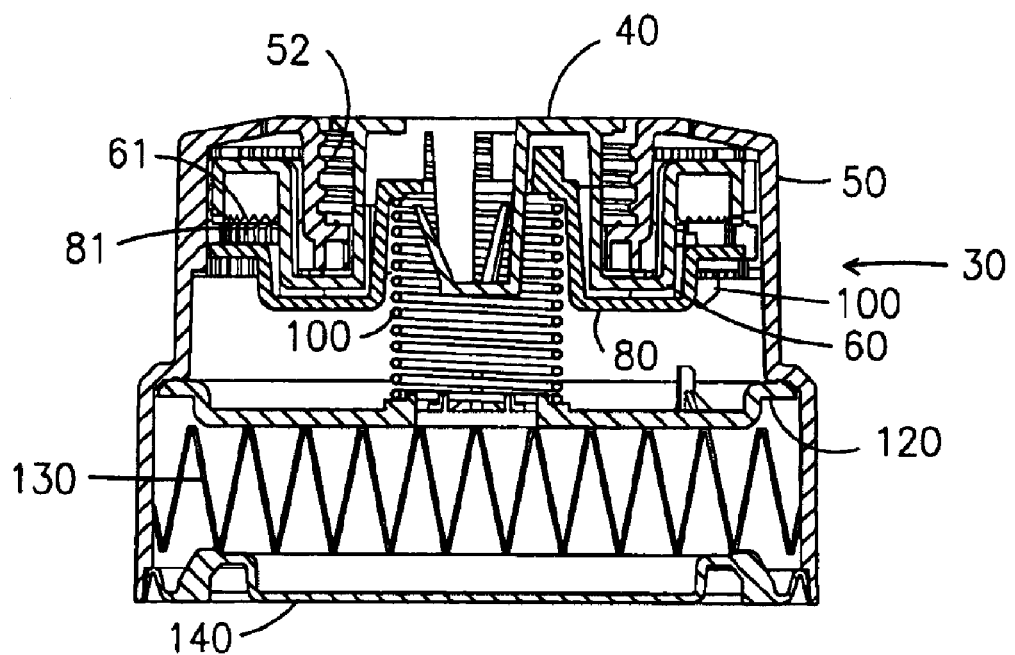
FIGS. 19 and 20 are sectional and sectional isometric views of a preferred filter shutoff device according to the present invention.
Figure 20:
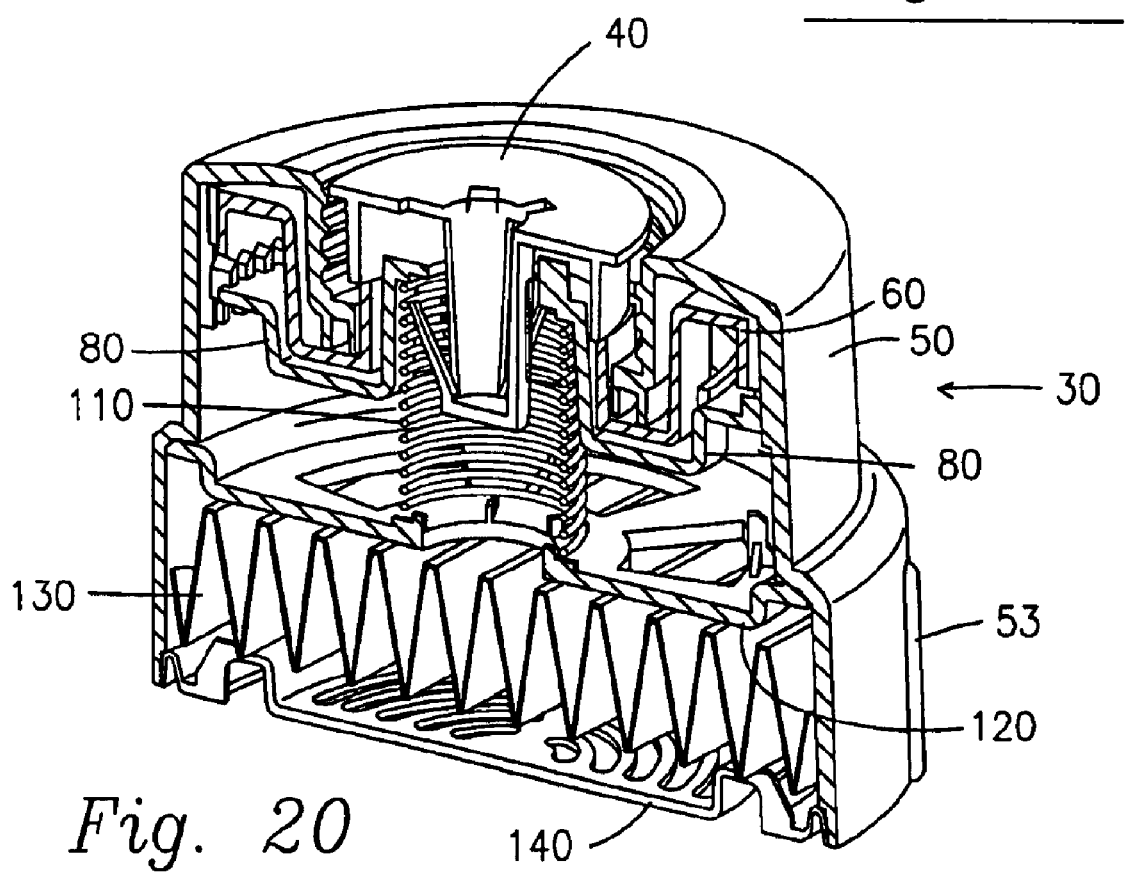
Figure 29:
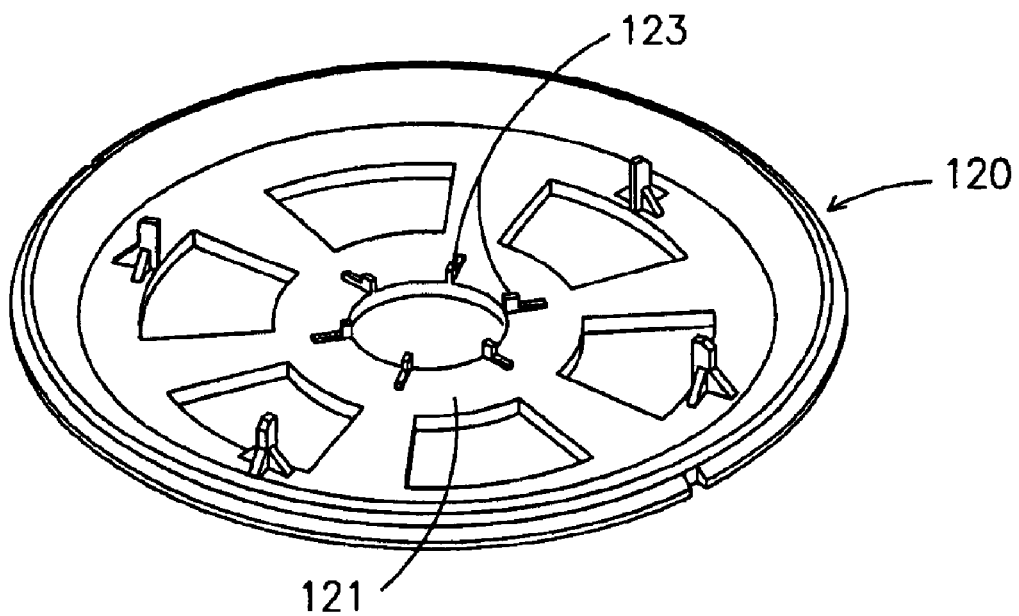
FIG. 29 is a top and side perspective view of a spring retainer useful with the present invention.
Figure 30:
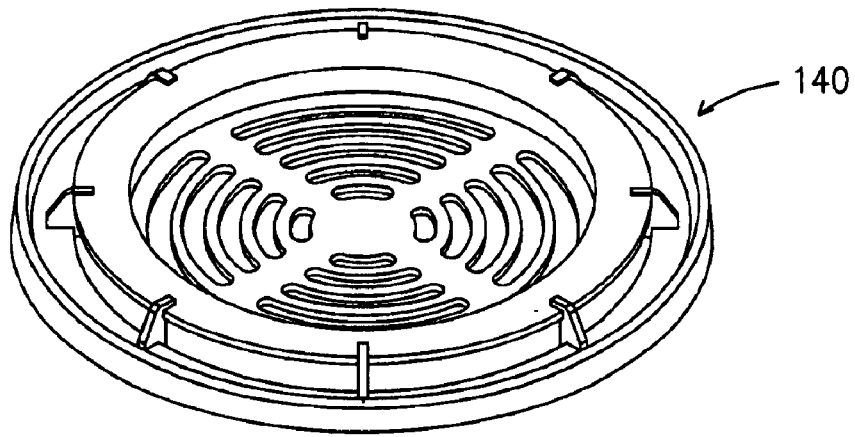
FIG. 30 is a top and side perspective view of a media cap useful with the present invention.
Figure 31:
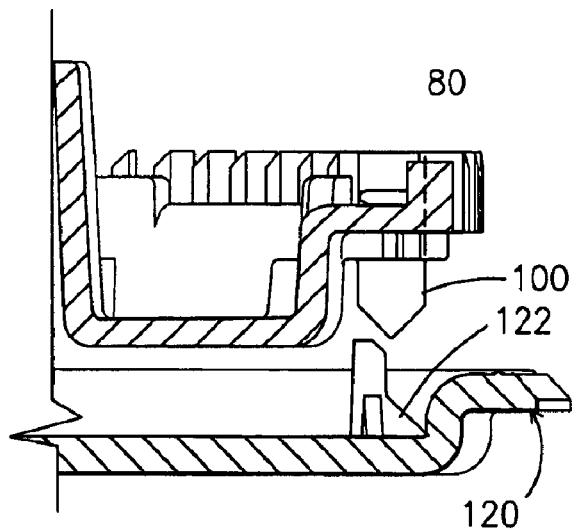
FIGS. 31–35 are enlarged, partial sectional views of the indexing ring and spring retainer, including a retractable tooth, useful in sensing water container size, as shown in FIG. 4, showing the retractable tooth moving toward and then engaging the space retainer, in a preferred embodiment.
Figure 32:
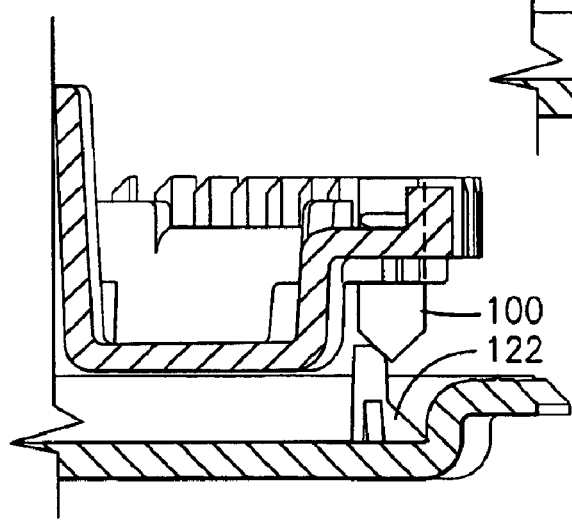
Figure 33:
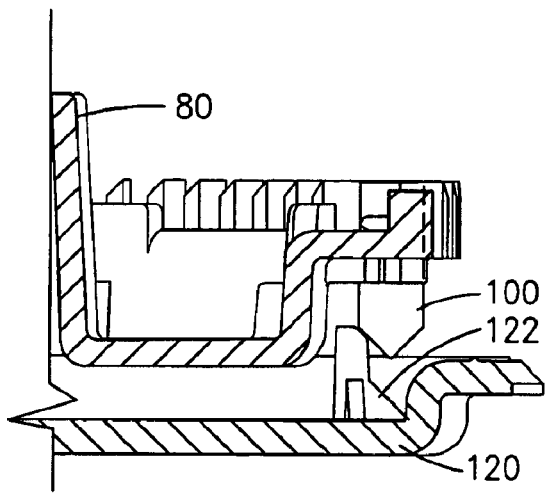
Figure 34:
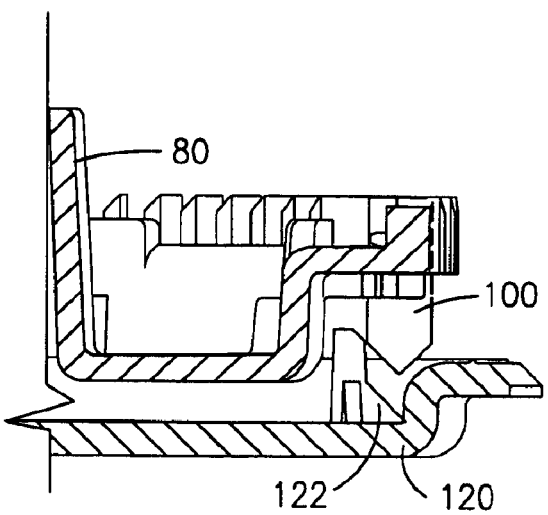
Figure 35:
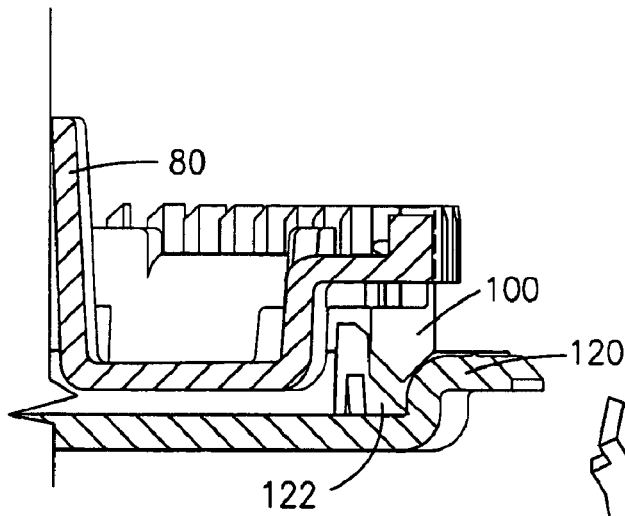
Figure 36:
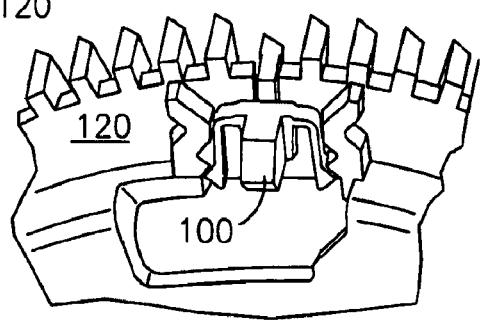
FIG. 36 is a side and bottom view of the spring retainer showing the retractable tooth of the indexing ring in a retracted position.

During assembly, indexing ring 80, having sides 80a (FIG. 25), may be placed up into the center opening of plunger 60. Spring 110 may be compressed between the lower side of upstanding center 82 (FIG. 25) on indexing ring 80 and the upper side of center ring 121 on spring retainer 120 using spring locators 123 (FIG. 29). Filter media 130 may be contained between spring retainer 120 and media cap 140, as better shown in FIGS. 19 and 20. In a preferred embodiment, filter shutoff device 30 may be replaced, rather than cleaned and re-used, when the useful life of the filter is over; alternatively, device 30 may be cleaned and reused, though for sanitary reasons this may be less desirable.

Referring to FIGS. 1–4, a preferred filter lid 50 may include threads 52 for connection to mating threads 25 on water-bottle 20. Ribs 53 may be provided on the outside surface of lid 50 to facilitate gripping of the housing by the user. Of course, a threaded connection between bottle 20 and the filter/shutoff mechanism is not required. For example, filter shutoff device 30 could be used with non-threaded connections between device 30 and water bottle 20 such as those described in U.S. Pat. Nos. 5,222,531 and 5,289,855, incorporated herein by reference, such that a cap could be press-fit onto the filter device. As another example, instead of both the water container and the filter shutoff device having threads, one could have a partial thread and the other a simple projection that would engage the partial thread when the filter shutoff device is rotated; this could act as a helical ramp for the projection, pulling the two components tightly together.

Figure 11:
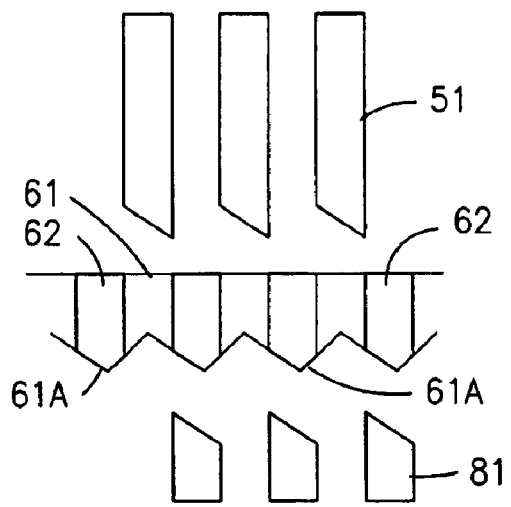
FIG. 11 is a side view showing indexing components of the device, including the upper/outer teeth, plunger and lower/inner teeth.
Figure 12:
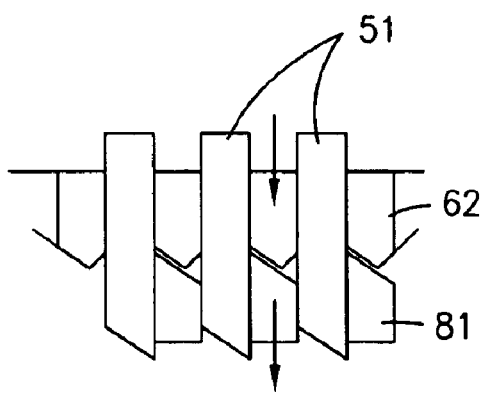
FIG. 12 is a side view of the components shown in FIG. 11 during engagement of a water bottle.

The structure of plunger 60 and indexing ring 80 of the preferred embodiment of the filter shutoff device 30 will now be more specifically described. In a preferred embodiment shown in FIGS. 4 and 11–12, plunger 60 may include an outer ring 61 with a predetermined number of lower, generally-rectangular shaped, inner, ridged teeth 62 spaced about its outer periphery. The outer periphery of indexing ring 80 may include a predetermined number of lower, upwardly depending, angled teeth 81, as shown in FIGS. 11–12, and designed to mesh with plunger teeth 62, as further described below. The precise number of teeth used with a particular shutoff device 30 is based upon the volumetric capacity of the water bottles to be used with device 30, as further explained below.

Figure 62:
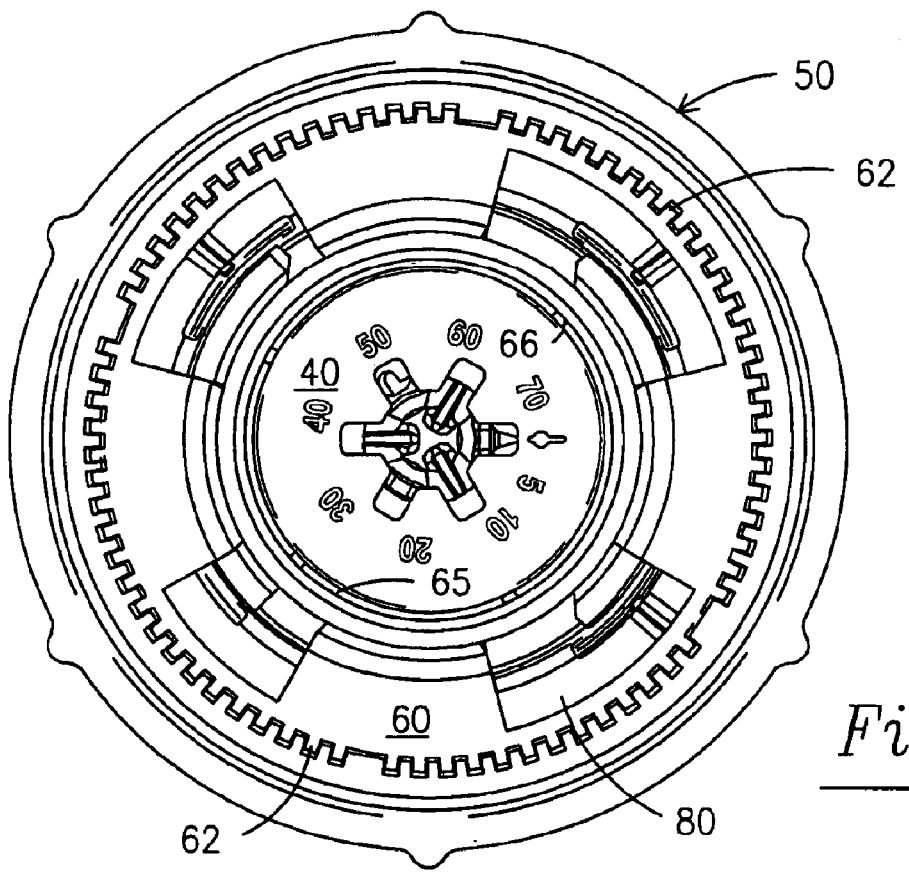
FIG. 62 is a top view of a preferred embodiment of the indexing mechanism shown in FIGS. 22 and 24.

The function and operation of the preferred embodiment of the preferred filter shutoff device 30 shown in FIGS. 1–4 and 18–20 will now be described. When a bottle is initially connected to shutoff device 30, the act of connection compresses spring 110 and moves plunger 60 in a downward direction. This is because interface 40 is forced down by the bottle neck during bottle connection, forcing down lower periphery 41 and, thus, upstanding plunger periphery 65 and plunger 60, as may be best understood by reference to FIGS. 4, 19 and 20. Referring now to FIGS. 11–12, plunger teeth 61, 62 are, accordingly, forced in a downward direction, as well, meshing outer plunger teeth 62 with lower indexing ring teeth 81, and aligning lid teeth 51 over (outside of and aligned with) inner plunger teeth 61 as shown in FIG. 62. Still referring to FIGS. 11–12, because plunger 60 is spring-loaded in an upward direction, and due to the configuration of the teeth, indexing ring teeth 81 will slide along plunger teeth 62, causing rotation of indexing ring 80 in a clockwise direction an amount about equal to the width of half of one tooth 51, after passing the lowest part of lid teeth 51. At this point, water bottle 20 is now in fixed engagement with filter shutoff device 30.

Figure 13:
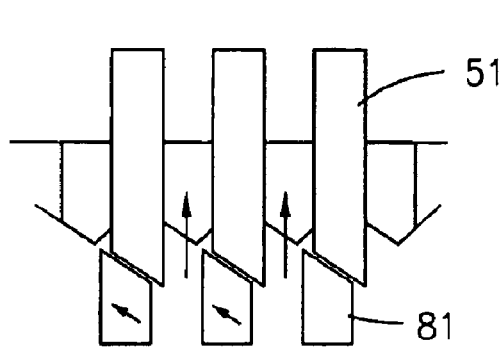
FIG. 13 is a side view similar to FIG. 12 during disengagement of a water bottle.
Figure 14:
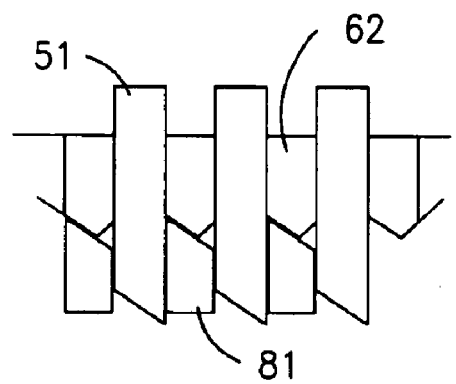
FIG. 14 is a side view similar to FIG. 12 showing the position of indexing components following the completion of one indexing cycle.

Referring now to FIGS. 13 and 14, when water bottle 20 is depleted and it is disconnected from lid 50 (e.g., by unscrewing and removing the water bottle), plunger 60 is now free to move up, as it is no longer retained in a lowered position by interface 40. Accordingly, plunger teeth 62 move in an upward direction, while ring teeth 81 move in an upper rotational direction, as indicated by the arrows of FIG. 13. As unscrewing of the water bottle continues, and referring now to FIG. 14, plunger 60 moves upwardly, allowing indexing ring teeth 81 to rotate and move upward as shown by the arrow, such that indexing teeth 81 slide past lid teeth 51 and into engagement with plunger teeth 62. One indexing cycle has now been completed. In this manner, successive bottles may be replaced and indexing cycles completed, with each bottle use corresponding to one indexing cycle.

Figure 22:
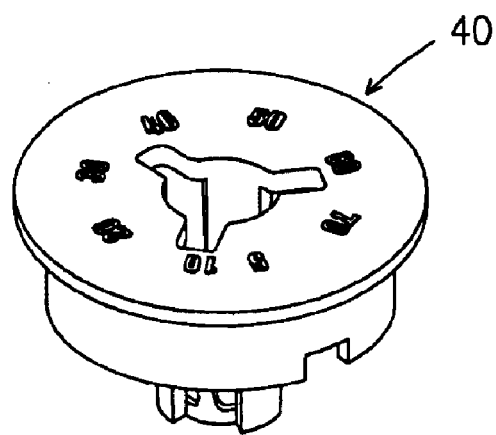
FIG. 22 is a top and side perspective view of a preferred interface mechanism.
Figure 23:
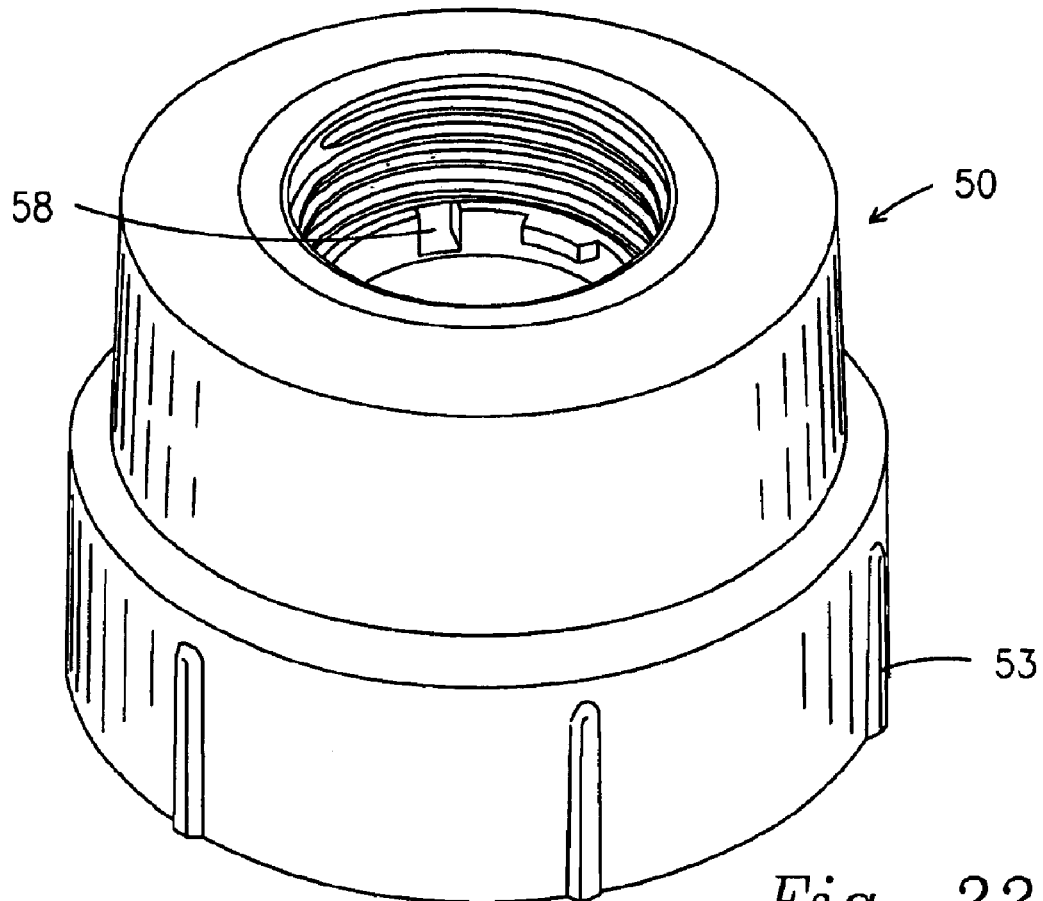
FIG. 23 is a perspective view of a lid useful for covering the shutoff mechanism of the present invention.
Figure 24:
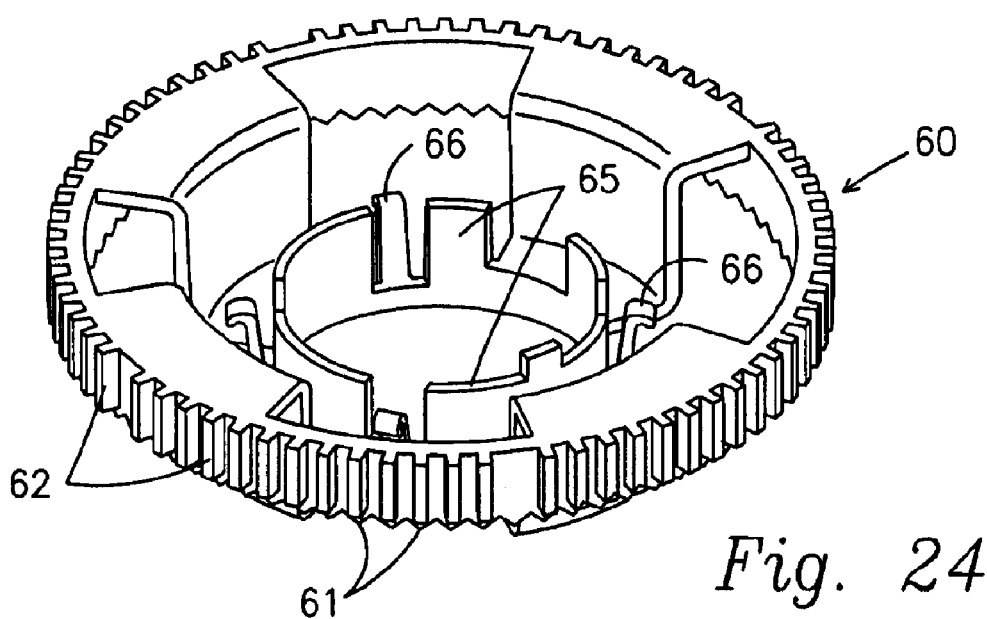
FIG. 24 is a top and side perspective view of a preferred plunger according to the present invention.
Figure 28:
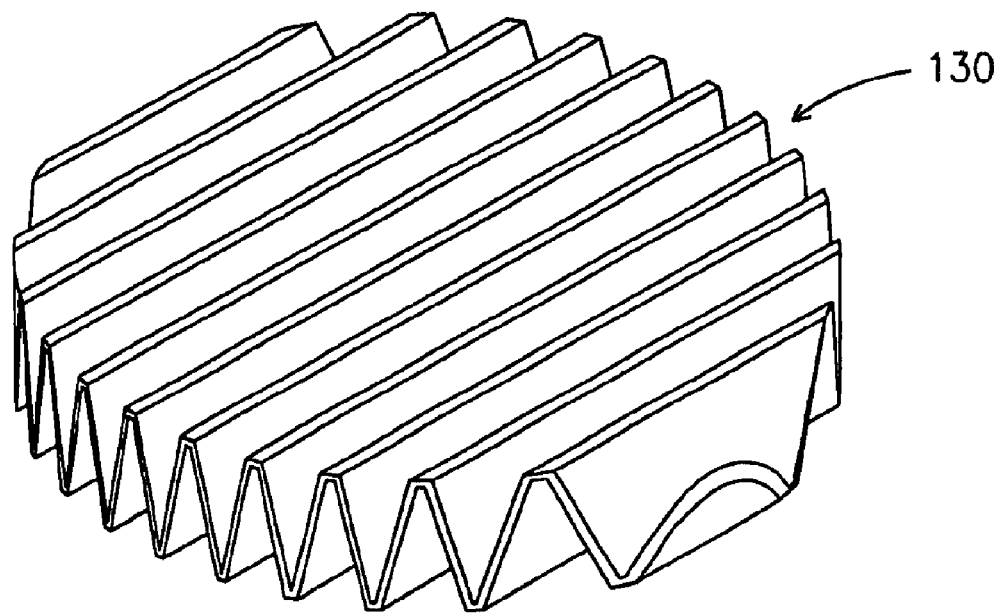

The number of indexing cycles, accordingly, matches the number of teeth in one complete revolution about the indexing ring. For example, if the chosen filter has a filtration capacity of 100 gallons, and 2-gallon bottles are used for dispensing, then an indexing ring with 50 teeth may be used. Indexing mechanism 40 may be used to show the consumer the state of the filter, by indicating the index position (FIG. 22). Referring now to FIGS. 4, 19–20 and 26, when the bottle is completely dispensed and one complete revolution has been made, plunger tabs 66 will be permitted to enter corresponding lid slots 58 shown in FIGS. 4, 23 and 63. When this occurs, the distal ends of plunger tabs 66 will be allowed to pop outwardly, moving locking tabs 66 (FIG. 24) onto lid shelf 58 (FIGS. 4, 23), and locking the plunger and thus also interface 40 in place. Interface 40 now covers lid threads 52, preventing further threadable engagement to a new water bottle. Filter shutoff device 30 (whose filter may be designed for a flow-through of 100 gallons or 50 2-gallon bottles, for example) may now be discarded and a new filter shutoff device 30 may now be used.

It has been found that the distal edges and angles of teeth 51 and 81 should be toleranced to within 6 micro-inches (thousandths of inches) using ABS plastic and EDM machining.

Those of ordinary skill will appreciate that the two-piece components bearing opposed teeth of the present invention will be much easier to mold and quality control, and substantially save in tooling costs, as compared to the one-piece mold having opposing teeth disclosed in U.S. Pat. No. 6,354,344.

Figure 6:
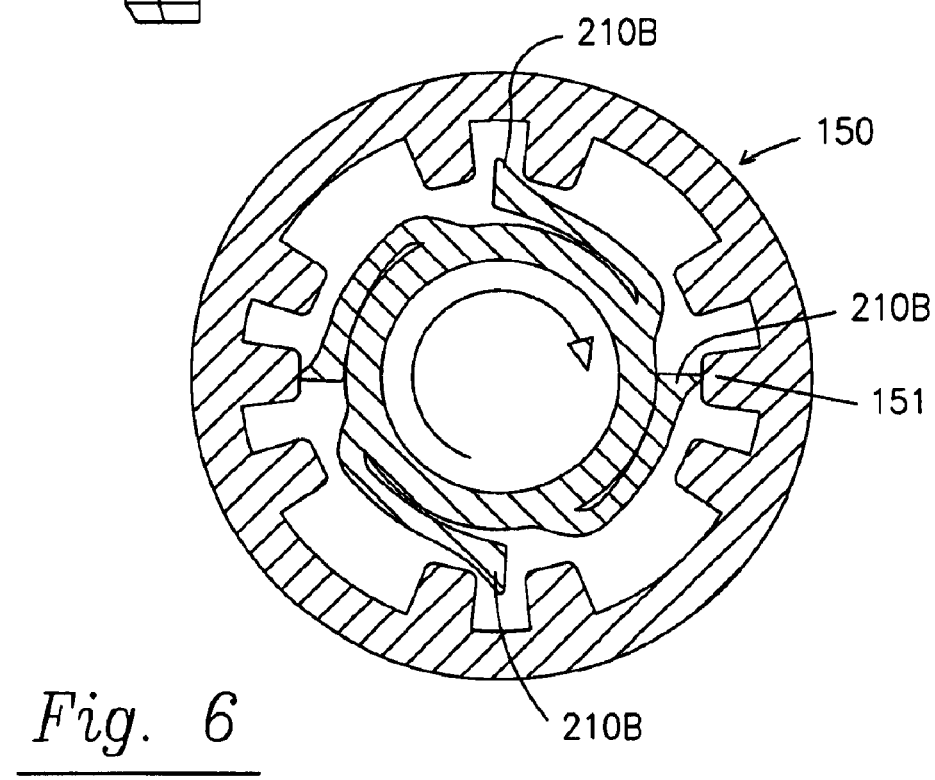
FIG. 6 is a top view of the indexing features of the filter shutoff device shown in FIG. 5.
Figure 7:
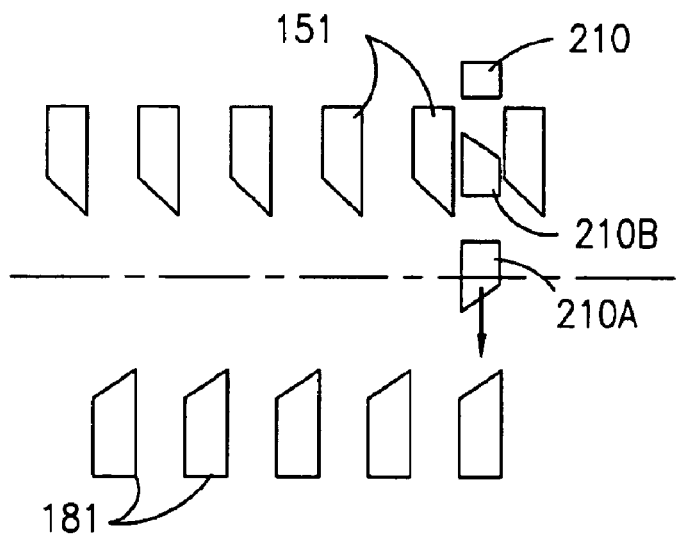
FIGS. 7–9 are side views of the upper/outer and lower/inner teeth of the filter shutoff device of FIG. 5, during the period of engagement of a water bottle to the device.
Figure 8:
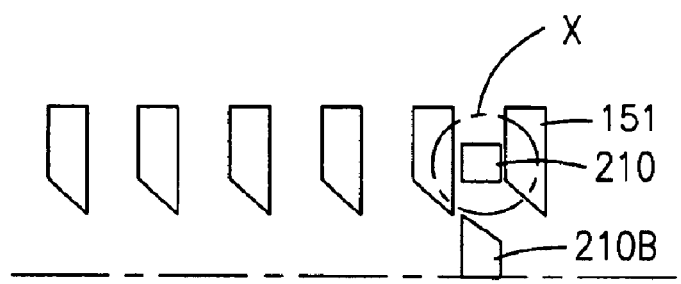
Figure 9:
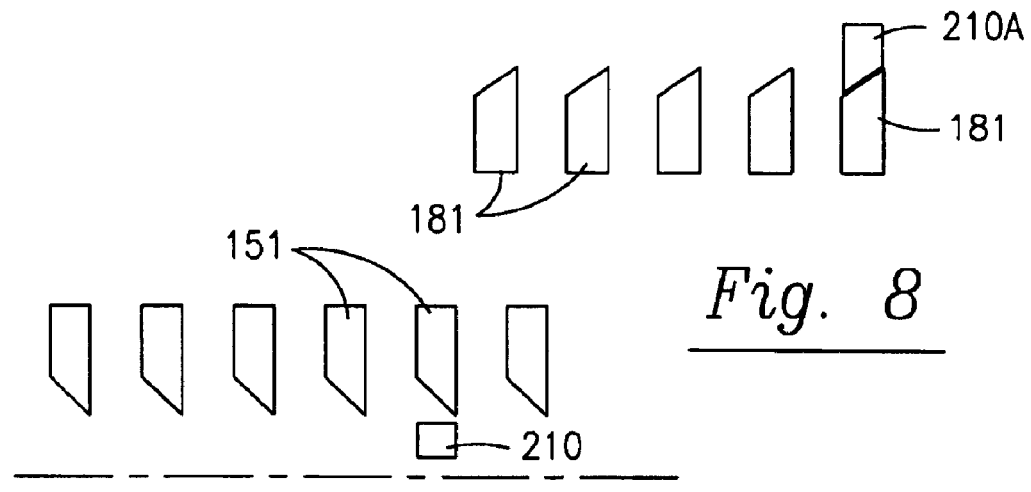

Referring now to FIGS. 5–10, an alternative embodiment of filter shutoff device 30 which does not include plunger 60 is provided. In this embodiment, lid 150 includes downwardly, fixed teeth 151, while indexing ring 180 employs a predetermined number of upwardly depending, fixed, angled teeth 181. Referring to FIG. 6, a counter-rotation cantilever/pin 210 rotates in an indexing direction as shown by the arrow, and includes rotating pins 210A (a pin for teeth 181) and 210B (a pin for teeth 151). As shown in FIG. 6, two cantilever/pins 210 are sitting on teeth 151, while two pins 210 sit inside the grooves between adjacent teeth 151. The teeth 151/pin 210 interaction is depicted in FIGS. 7–9. As shown in FIG. 7, outer pin 210B is a pin whose distal end sits within the groove between teeth 151, while inner pin 210A is a pin whose distal end sits on teeth 181. Still referring to FIG. 7, as a water bottle is engaged to lid threads 152, upper teeth 151 remain fixed, and inner pin 210A moves downwardly in the direction of the arrow. Two of the four counter-rotation cantilever/pins 210 prevent backward movement, as they sit inside the grooves between adjacent teeth 151, while the other two pins 210 simply rest on teeth 151. As threaded engagement with the water bottle continues, successive pin movement, including downward movement of pin 210A, is shown in FIGS. 8 and 9. Counter-rotation pins 210 prevent backward movement in the transition area shown by the dotted circle X in FIG. 8. As shown in FIG. 9, pin 210A contacts the angle of lower teeth 181, and then slides down into the next groove between teeth 181 in the direction of the arrow as shown. Transitioning between FIGS. 8 and 9, cantilever/pin 210 within dotted circle X will climb up and down tooth 151; indexing forward a half-notch rotation thus occurs, and the water bottle is now fully engaged to filter shutoff device 30.

Figure 10:
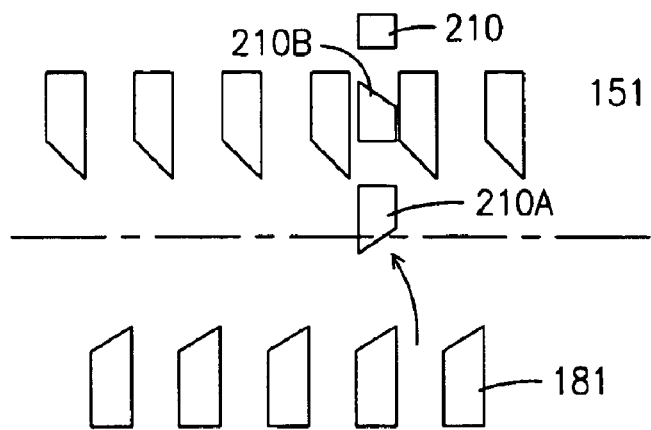
FIG. 10 is a side view similar to FIGS. 7–9 during the period when a water bottle is disengaged from the device.

Referring now to FIG. 10, and still with regard to the alternative embodiment shown in FIGS. 5–10, when the water bottle is empty and disengaged, the indexing pins move in an upward direction as shown. Again, moving between FIGS. 9 and 10, two of the four cantilever/pins 210 will climb up teeth 151 when unscrewing the water bottle; then, pin 210B contacts teeth 151 and starts rotating forward a half-notch in the direction of the arrow. At the same time, pins 210 climb down teeth 151, completing one indexing cycle.

Referring to FIG. 25, arrow 87 provides a visual indicator to the user of the iteration position for the indexing mechanism, by indicating the position shown in the top of interface 40, in rotational degrees, as shown in FIG. 62.

Figure 15:
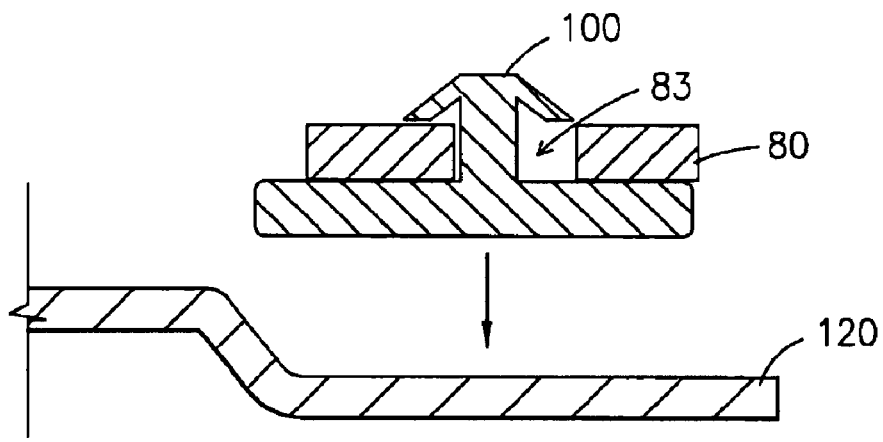
FIG. 15 is a partial side cross-sectional view of certain shutoff design components, including the indexing ring, retractable tooth and retainer ring, useful in sensing water container size.
Figure 16:
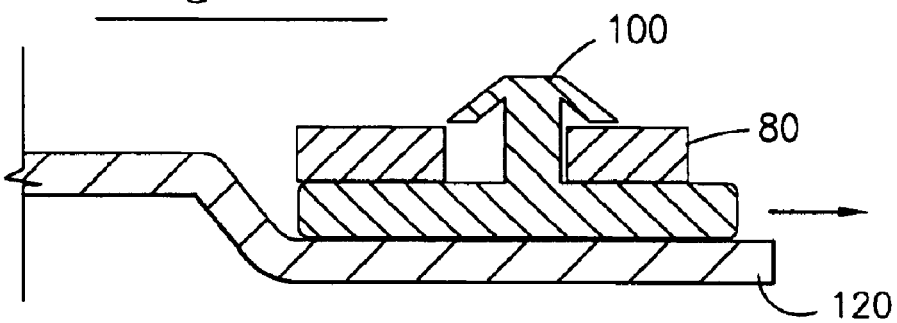
FIG. 16 is a view similar to FIG. 15 showing the retractable tooth in engaged position.
Figure 17:
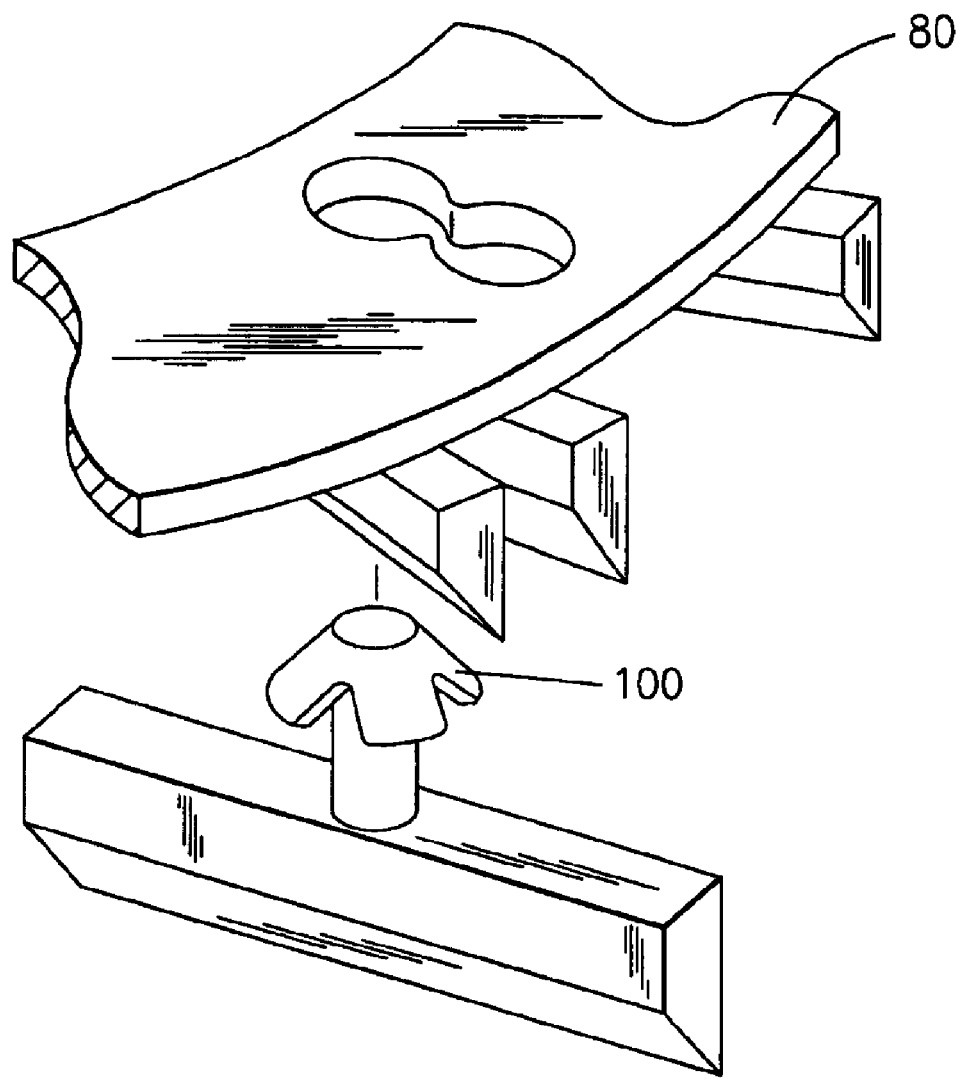
FIG. 17 is a perspective view of the components shown in FIGS. 15–16.
Figure 18:
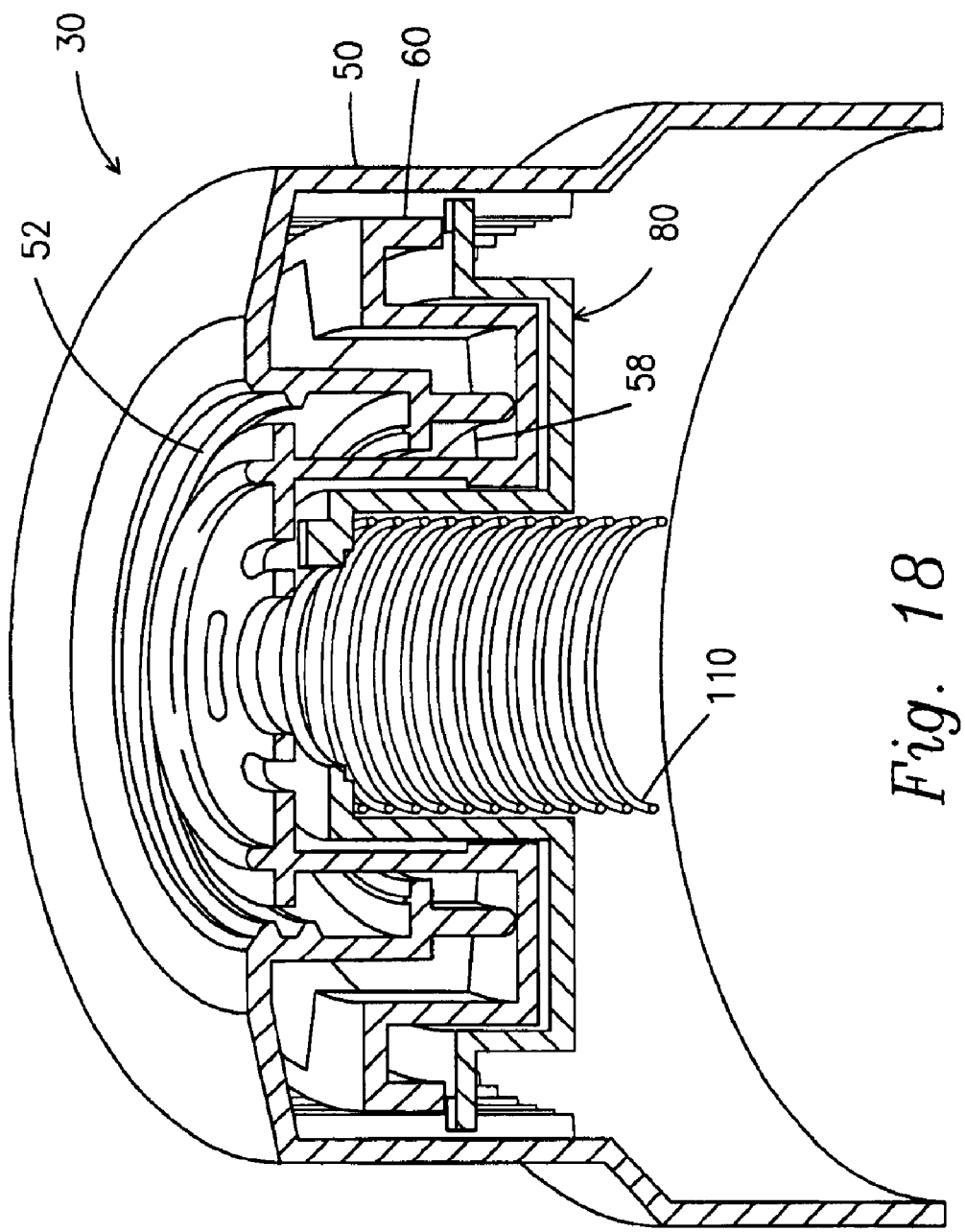
FIG. 18 is partial top perspective and side cross-sectional view of the shutoff filter according to one preferred embodiment of the present invention.

Referring now to FIGS. 15–17, as well as the alternative embodiment shown in FIGS. 4, 27 and 31–35, an additional feature of the present invention is the ability to differentiate between dissimilar reservoir volumes while supplying a predetermined filtration capacity. Thus, using the present invention, bottles with varying volumetric capacities may be sensed, and the disabling/lockout function may be varied depending upon the results, as will now be described. Water bottles may be designed such that, in a preferred embodiment, the 2-gallon bottle has a longer neck than the 3-gallon bottle. In the preferred embodiment, an indexing mechanism with 75 positions is used. Assuming a filtration capacity of 150 gallons, the 2-gallon bottle traverses 75 indexing positions before the filtration capacity is reached, whereas the 3-gallon bottle traverses 50 indexing positions. Thus, referring first to the embodiment shown in FIGS. 15–17, retractable tooth 100 engages opening 83 in indexing ring 80. As bottle engagement occurs and indexing ring 80 and tooth 100 move downward to abut spring retainer 120 (FIG. 15), tooth 100 is permitted to move peripherally outward via opening 83 (FIG. 16), locking tooth 100 in place and ensuring that the indexing ring and other components are also locked in place such that the components which should be used for the determined volumetric capacity will in fact be used. (It may be noted that the indexing ring and other components are still moving freely. FIGS. 15–16 depict actions occurring during connection of 2-gallon water bottle only, ensuring that the indexing piece traverses 75 indexing positions.) Using this retractable tooth, if a different bottle neck length is associated with a 2-gallon bottle as opposed to a 3-gallon bottle (for example), locking tooth 100 may be engaged for one reservoir size but not the other. Thus, with the current design, longer-necked 2-gallon bottles will engage tooth 100 and cause the indexing components to move, ensuring the lock-out function will not be engaged. In the preferred embodiment, the 3-gallon water bottle has a shorter bottle neck than the 2-gallon water bottle, such that the indexing piece only traverses 50 indexing positions, and the action shown in FIGS. 15–16 does not come into play.

Figure 64:
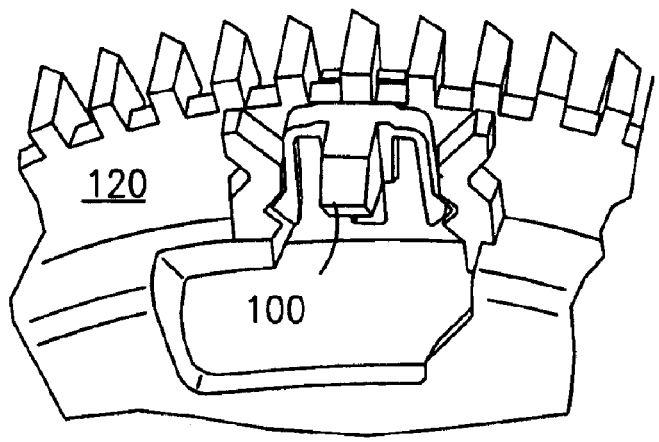
FIG. 64 is a view similar to FIG. 36 showing the spring retainer locked in position.

Similarly, referring now to the alternative embodiment shown in FIGS. 4, 27 and 31–36, it will now be understood that retractable tooth 100 generally works in the same manner as in the embodiment shown in FIGS. 15–17. As shown in FIGS. 31–36, as indexing occurs retractable tooth 100 moves downward, impacting angled flange 122 on spring retainer 120, until tooth 100 is finally locked in place as shown in FIG. 64. Using these embodiments, when the teeth are aligned directly over their corresponding apertures, whether at the $50^{th}$ or $75^{th}$ index (assuming a 150 gallon filtration capacity), lockout will occur. Of course, using the principles of the present invention, it will be readily apparent that reservoirs of any size (e.g., 1 gallon and 5 gallon, etc.) may be used in connection with filter shutoff device 30, as the number of teeth and relative geometries may be adjusted to account for varying reservoir and filtration capacities. Using these principles, it may also be easily envisioned that a single shutoff device may account for even more than 2 different reservoir sizes.

Referring now to FIGS. 21 and 37–49, another aspect of the present invention employs a replaceable filter cartridge 260 designed to work with the above-described shutoff mechanism. As further described below, replaceable filter cartridge 260 may be designed to interact within shutoff device 30 so that when shutoff is enabled, a built-in index reset occurs as the used filter cartridge is removed and replaced. In one embodiment, replaceable cartridge filter 260 is designed to interact with shutoff device 30 automatically during initial installation, and then again when reaching the end of the cartridge's useful life. More specifically, as the indexing mechanism for filter shutoff 30 reaches the last index, and the filter is shut off preventing further usage, filter cartridge 260 provides a built-in index reset during filter cartridge replacement, by moving the indexing mechanism to its starting position during the used cartridge ejection process, as now described in detail immediately below.

Figure 21:
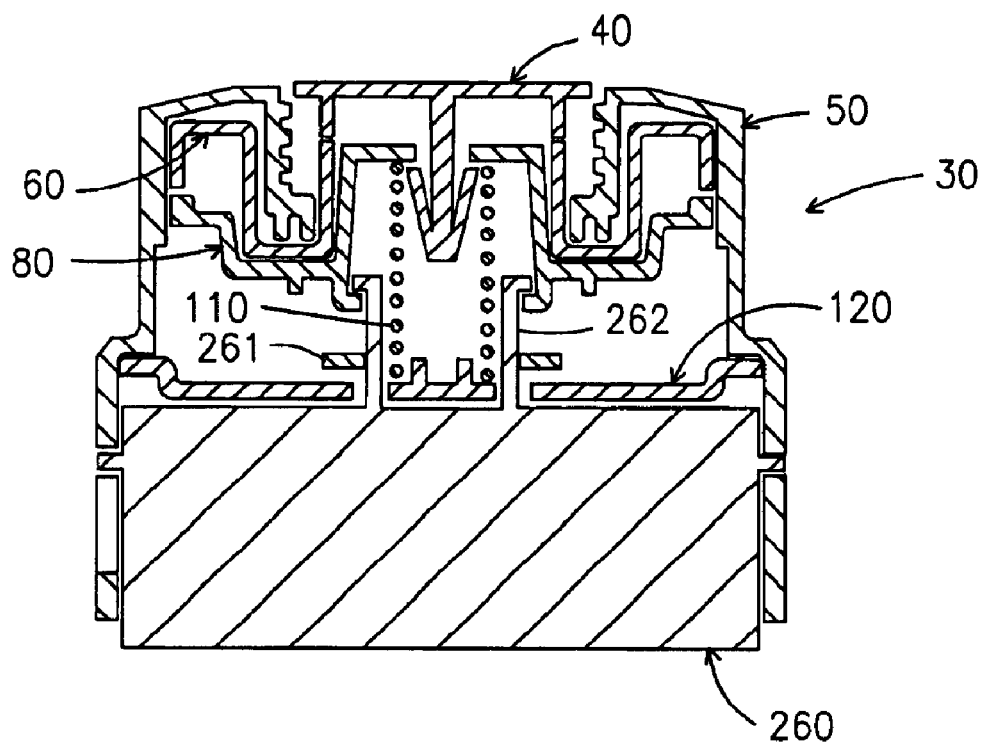
FIG. 21 is a sectional view of a preferred filter shutoff device according to the present invention incorporating a filter shutoff mechanism and a preferred replaceable cartridge.
Figure 37:
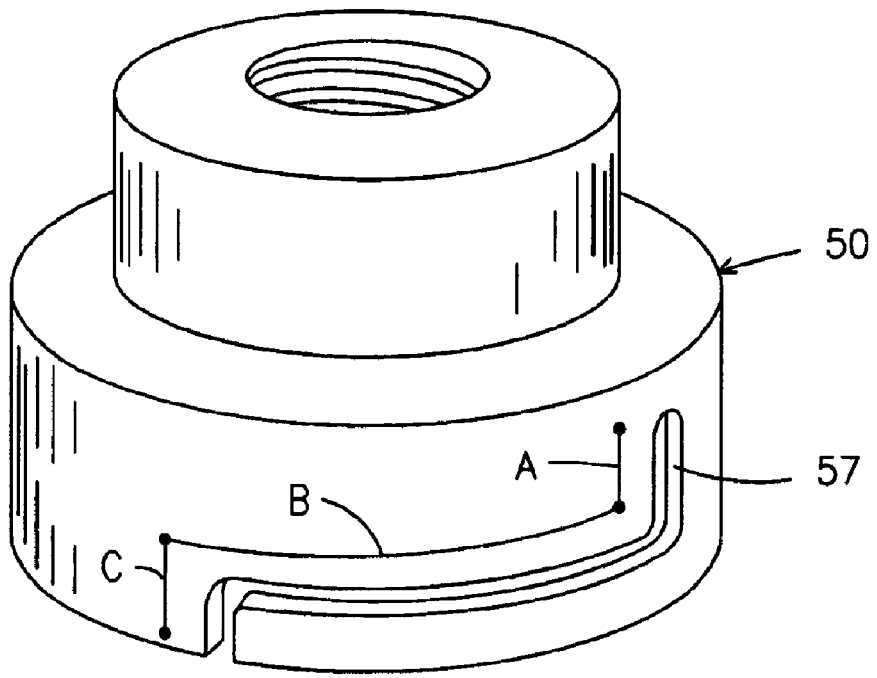
FIG. 37 is a perspective view showing a lid embodiment with a guiding groove for circumscribing a guiding pin on the replaceable cartridge.
Figure 38:
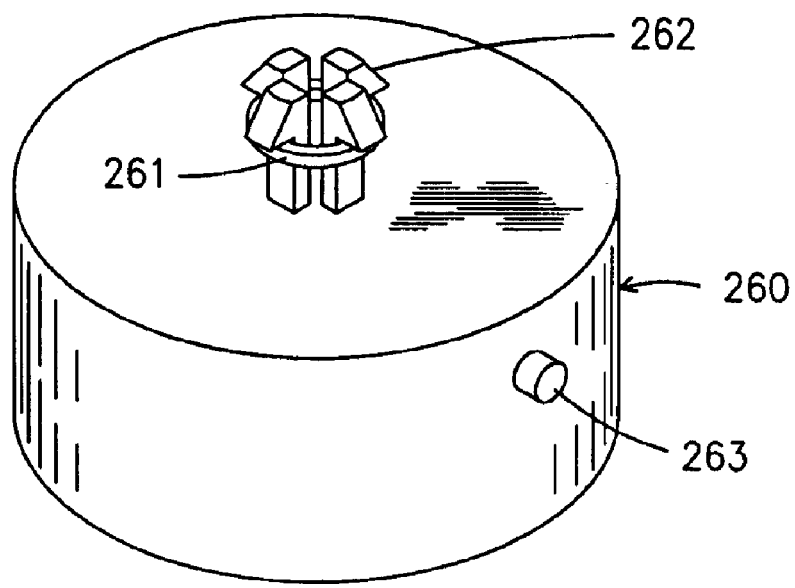
FIGS. 38 and 39 show perspective views of a preferred embodiment of a replaceable cartridge.
Figure 39:
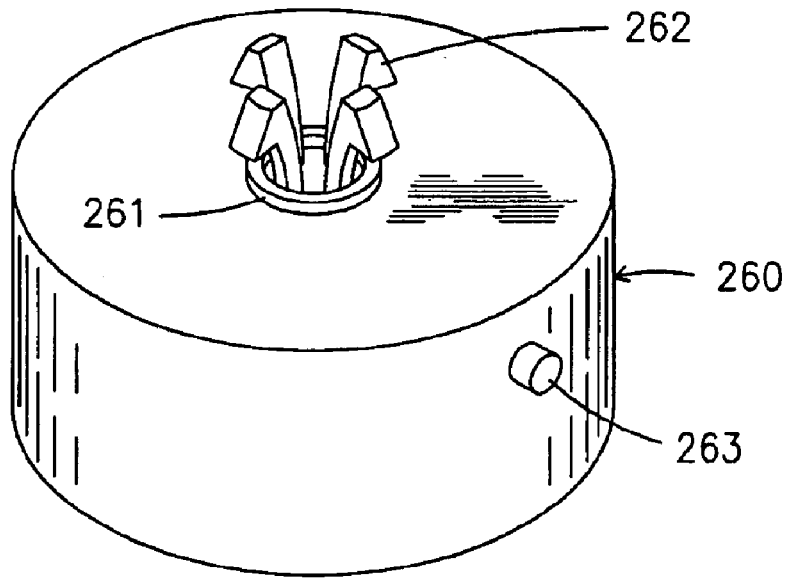
Figure 40:
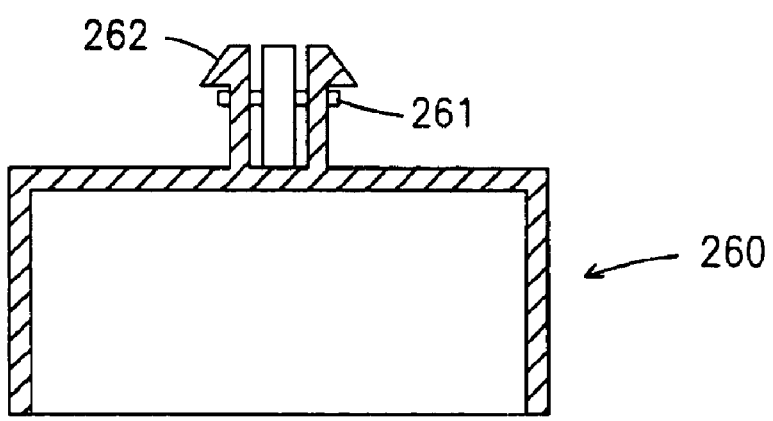
FIG. 40 is a sectional view of the replaceable cartridge shown in FIGS. 38–39.
Figure 41:
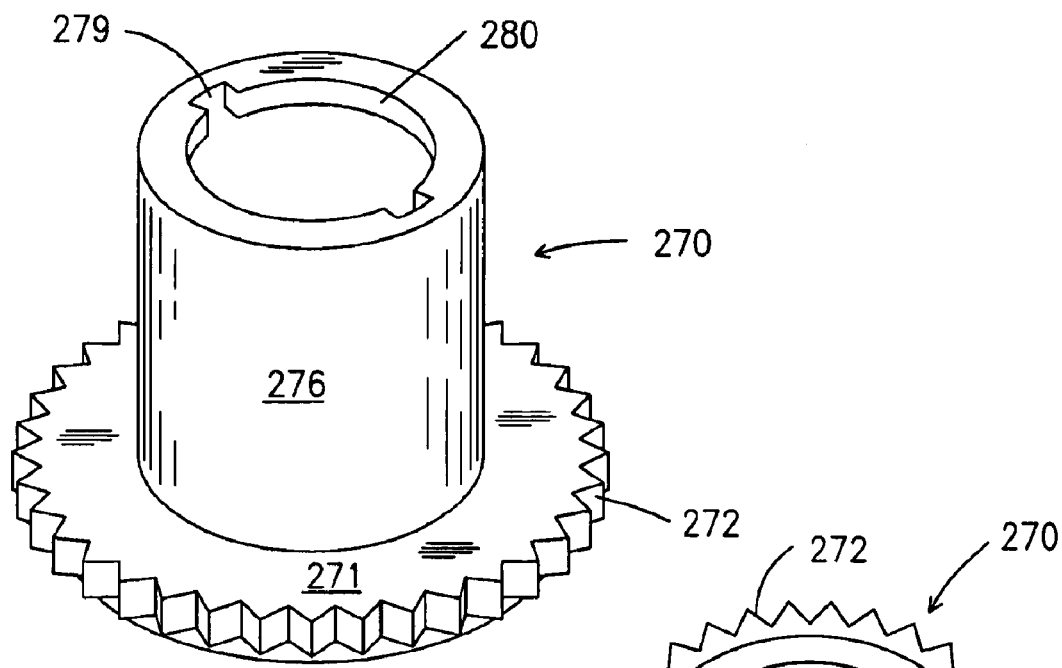
FIG. 41 is a perspective view of an indexing piece for the replaceable cartridge.
Figure 42:
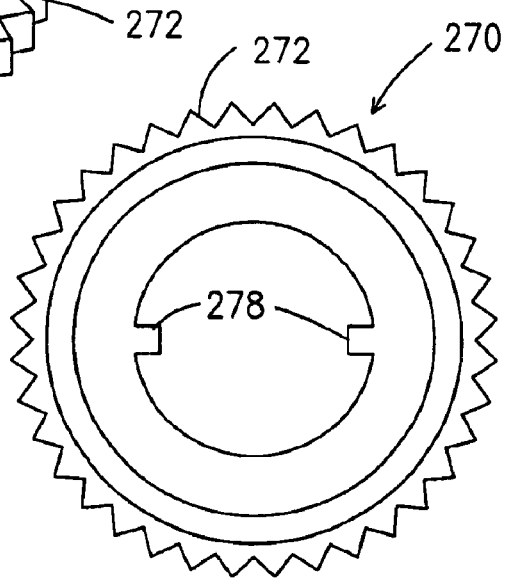
FIGS. 42 and 43 are bottom and sectional views of the indexing piece shown in FIG. 41.
Figure 43:
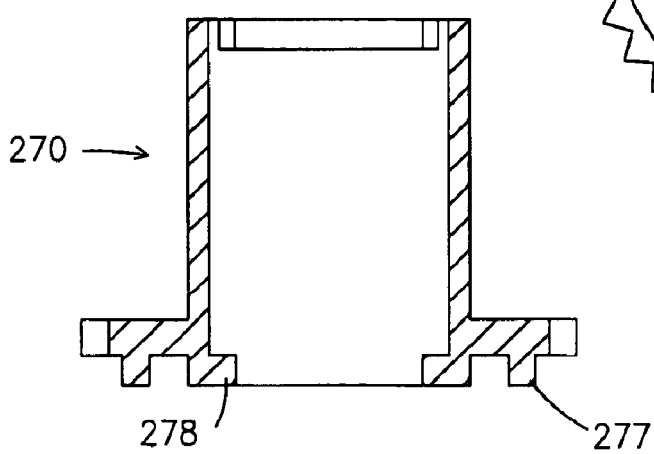

In a preferred embodiment, replaceable filter cartridge 260 is designed to fit inside the lower portion of lid 50, and beneath the filter shutoff mechanism, as shown in FIG. 21. Referring to FIGS. 38–40, filter cartridge 260 includes seal ring 261, four lockout arms 262, guiding pin 263 and grip area 264. Referring to FIGS. 37 and 38, guiding pin 263 moves circumscribed by groove 57 of lid 50. Cartridge indexing piece 270 (FIGS. 41–49) includes cartridge base 271 and upstanding cartridge cylinder 276. Cartridge base 271 includes cartridge base teeth 272. Referring to FIGS. 42 and 43, cartridge base 271 also includes annular locking arm retainer ring 277 and resetting notch 278.

During use, seal ring 261 is initially in the location with respect to lockout arms 262 as shown in FIGS. 21 and 38. During first bottle installation, ring 261 moves in a downward direction, as shown in FIG. 39, allowing lockout arms 262 to begin to blossom. As shown in FIG. 37, guiding pin 263 may move within guiding groove 57 of lid 50, tracing Paths A, B and C. By following paths B and C, the cartridge may be rotated out and removed. (In the embodiment disclosed here, a 120° revolution may correspond to 25 teeth though, of course, other shutoff embodiments may be employed.) A new cartridge is inserted by following Path C and then Path B on lid 50. The new cartridge is set in final position upon finishing Path A, which may be confirmed by a tactile and sound ("click") feedback.

The operation of the replaceable filter cartridge using either a 2-gallon or a 3-gallon water bottle will now be described. As will be understood, lockout arms 262 are designed to prevent a used filter cartridge from again being installed and reused. During engagement with a 3-gallon water bottle, in the preferred embodiment, two of the four lockout arms 262 will be used to prevent engagement of a used filter cartridge, while the remaining two lockout arms will be used to reset the indexing mechanism during the cartridge removal procedure.

Figure 44:
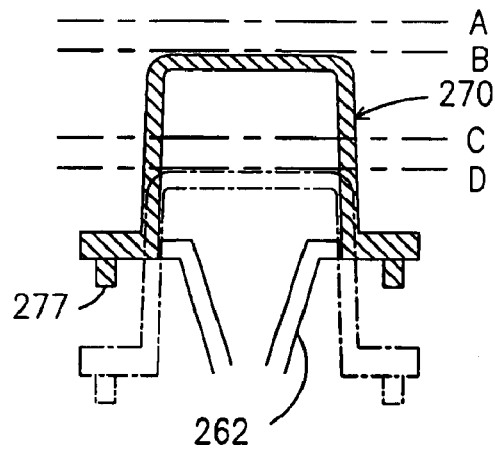
FIGS. 44–53 are successive sectional views of the interaction between the lockout arms and the indexing piece of a preferred embodiment of the replaceable cartridge, when engaged to a 2-gallon water bottle (FIGS. 44, 46, 48, 50 and 52) and when engaged to a 3-gallon water bottle (FIGS. 45, 47, 49, 41 and 53)
Figure 45:
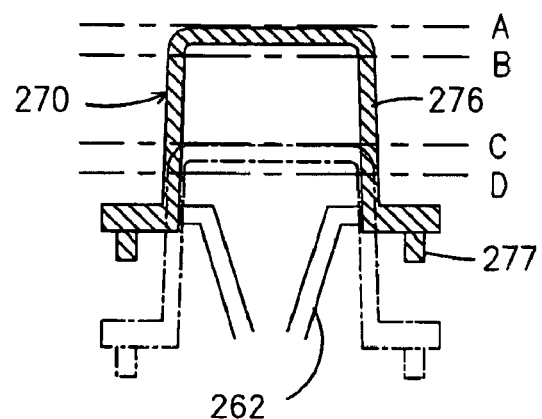
Figure 46:
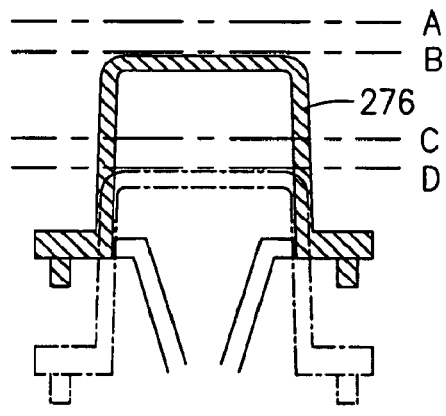
Figure 47:
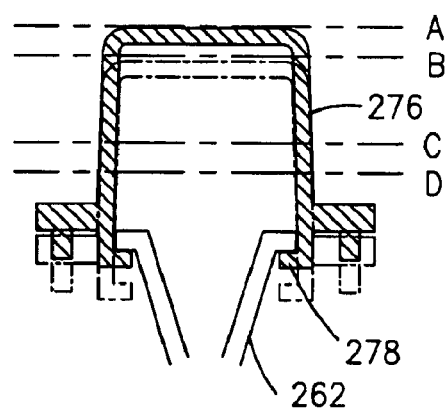
Figure 48:
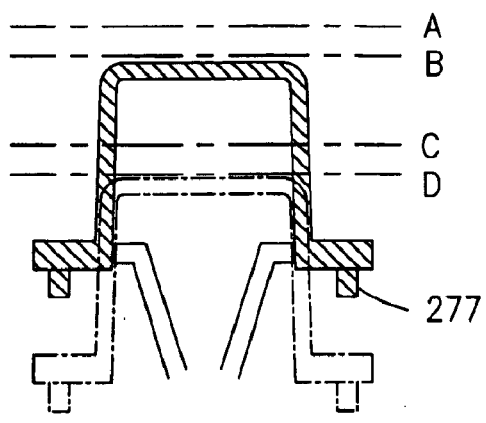
Figure 49:
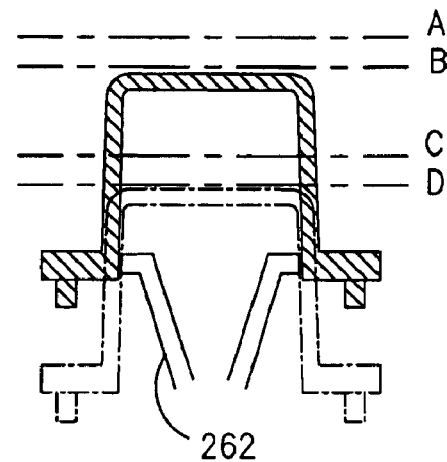
Figure 50:
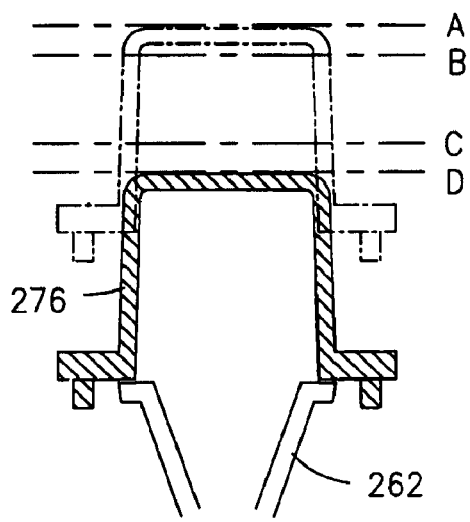
Figure 52:
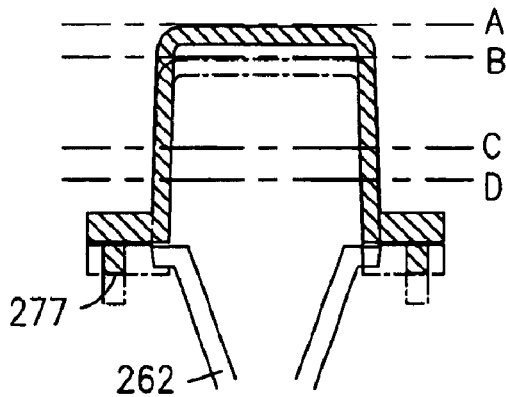

Referring first to FIG. 38 and then to FIG. 39, seal ring 261 moves during first bottle installation as shown. Lockout arms 262 will remain within indexing piece 270. Referring now to the mechanism as used with a 2-gallon water bottle, shown in FIG. 44, at indexing position 49 (assuming indexing position 50 is the final indexing position when the 3-gallon water bottle is engaged), retractable teeth 272 will be extended, allowing the indexing mechanism to pass indexing position 50 and move forward to indexing position 75 and lockout. Horizontal line "A" shown in FIG. 44 is the lockout position achieved by the shutoff mechanism when using either 2-gallon or 3-gallon water bottles, while line "B" is the filter shutoff position when the water bottle has been removed. Lines "C" and "D" are the filter shutoff locations when the 3-gallon and 2-gallon water bottles are engaged, respectively. Continuing on, and referring now to FIG. 46, at indexing position 50, for the 2-gallon bottle, retractable teeth 272 are extended out, and no missing teeth are present on indexing piece 270. At the position shown in FIG. 46, the four lockout arms 262 will remain within indexing piece 270. At indexing position 51 (FIG. 48), the retractable teeth set will retract back and disengage, ready for the next cycle, while all four lockout arms 262 will again remain within indexing piece 270. This will continue to be the position for indexing positions 52–74, when the 2-gallon bottle is engaged. Then, upon reaching indexing position 75 (still using the 2-gallon water bottle), missing teeth 272 on indexing piece 270 will line up with steps 51 on lid 50, leaving indexing piece 270 free to bounce upward (under influence of spring 110) to its lockout position. At this lockout position, each of the four lockout arms 262 will stretch out and sit beneath indexing piece 270, preventing indexing piece 270 from moving any further in a downward direction, as shown in FIG. 50. Lockout in the "up" position has now been achieved. Pushing on interface ring 40 with more force again automatically triggers the ejection sequence for the used filter cartridge, as shown in FIG. 52. Tactile feedback (the force difference) may be provided; visual feedback (e.g., a red warning message) may also be provided on the outside surface of the cartridge, using over-mold or in-mold decorations, or using a pad printing or screen printing process. When the filter cartridge is ejected along path A, the visual feedback may be shown around grip area 264. Referring back to FIG. 37, path A along lid 50 has now been completed.

Figure 51:
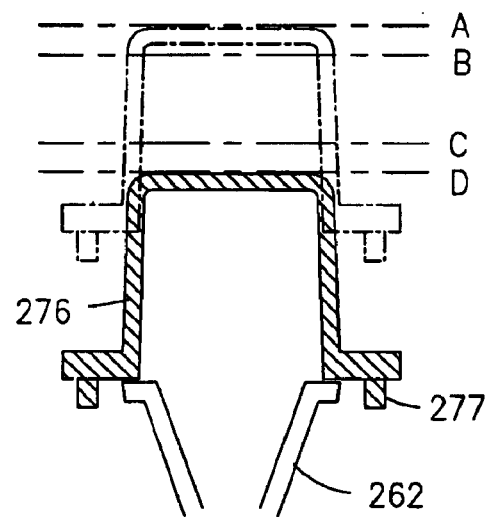
Figure 53:
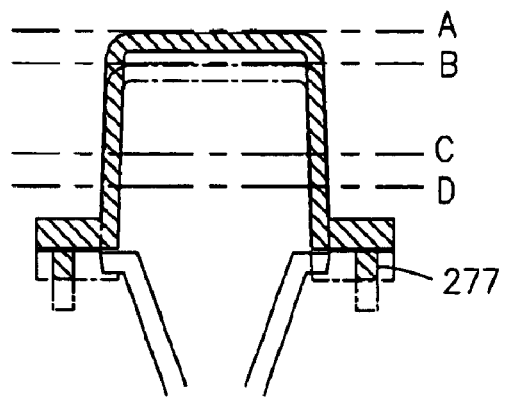

In contrast, when a 3-gallon bottle is used, and referring now to FIG. 45, seal ring 261 again moves during first bottle installation as shown, while lockout arms 262 again remain within indexing piece 270. However, now retractable teeth set 272 will not be extended out and engaged at indexing position 49, since the performance indication device (PID) stroke is shorter, as controlled by the shorter, 3-gallon bottle neck. At indexing position 50 for the 3-gallon bottle (FIG. 47), retractable teeth 272 were not extended out, and missing teeth 272 on indexing piece 270 are free to line up with steps 51 on lid 50, so that indexing piece 270 is permitted to bounce upwardly to a lockout position. Still referring to FIG. 47, at this position, one pair of lockout arms 262 will still be sitting inside indexing piece 270 for resetting purposes, as shown, nestled against annular tabs 278. Still at indexing position 50, and referring now to FIG. 53, the remaining pair of lockout arms 262 will stretch out and sit beneath indexing piece 270 to prevent indexing piece 270 from moving any further in a downward direction. Lockout in the "up" position has now been achieved. Finally, referring to FIG. 51, pushing on interface ring 40 with more force again automatically triggers the ejection sequence for the used filter cartridge. Again, tactile feedback (the force difference) and/or visual feedback may be provided, as discussed above. Referring back again to FIG. 37, path A along lid 50 has now been completed.

Figure 66:
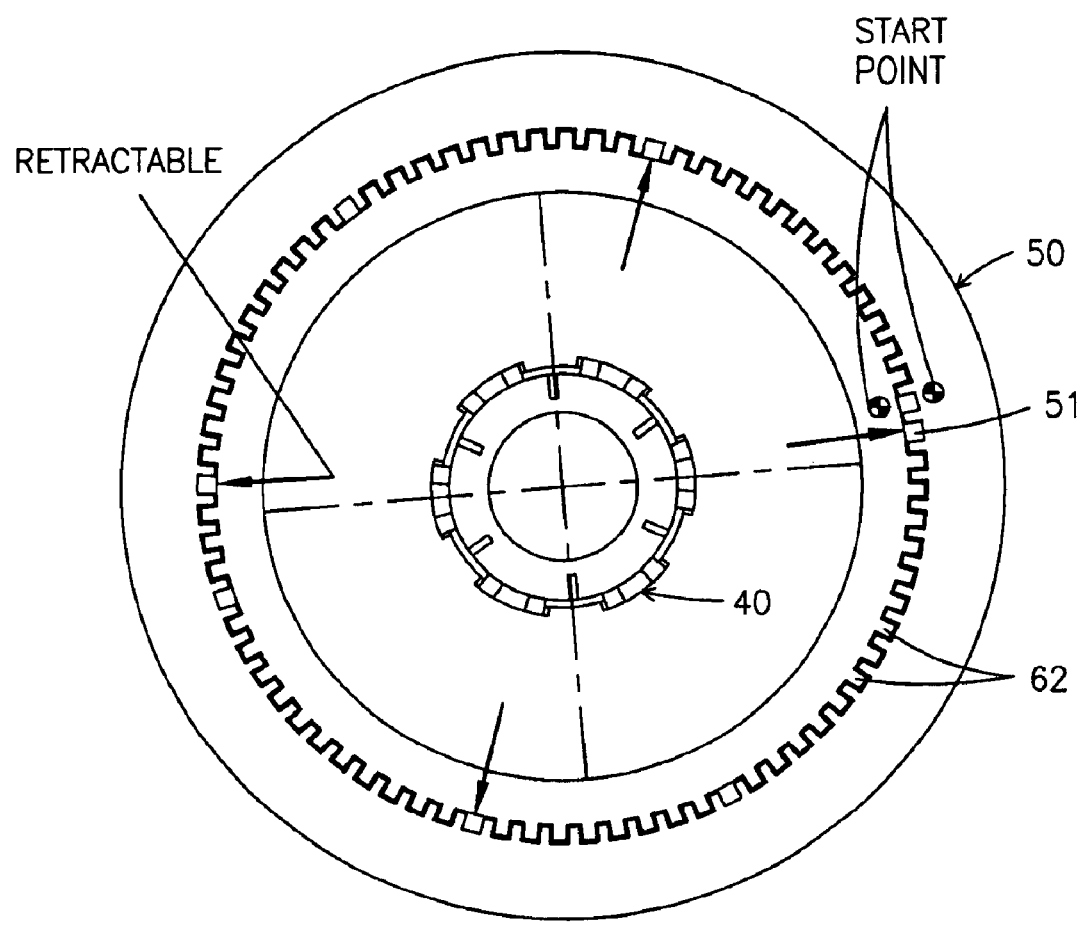
FIGS. 66–71 are top views of a paper mock-up illustrating the tooth interaction during successive filter use leading to a lock-out condition.
Figure 67:
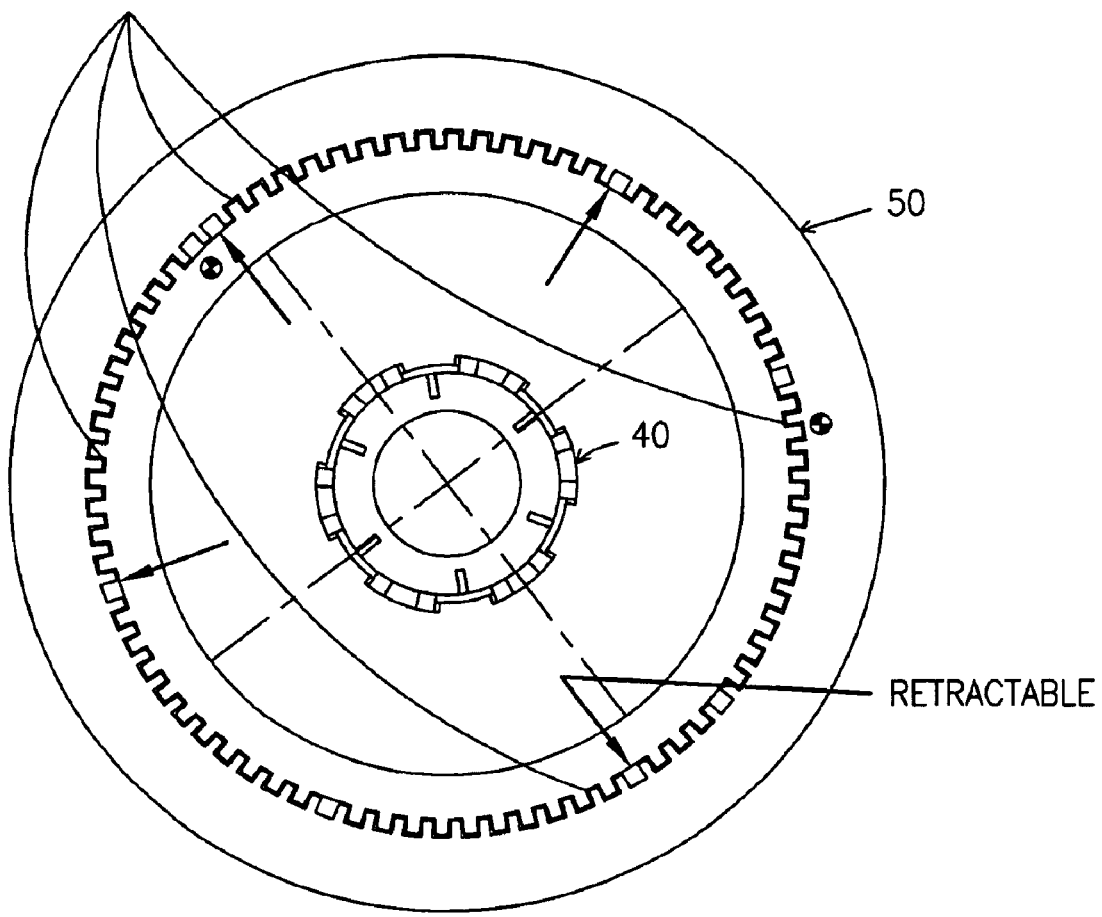
Figure 68:
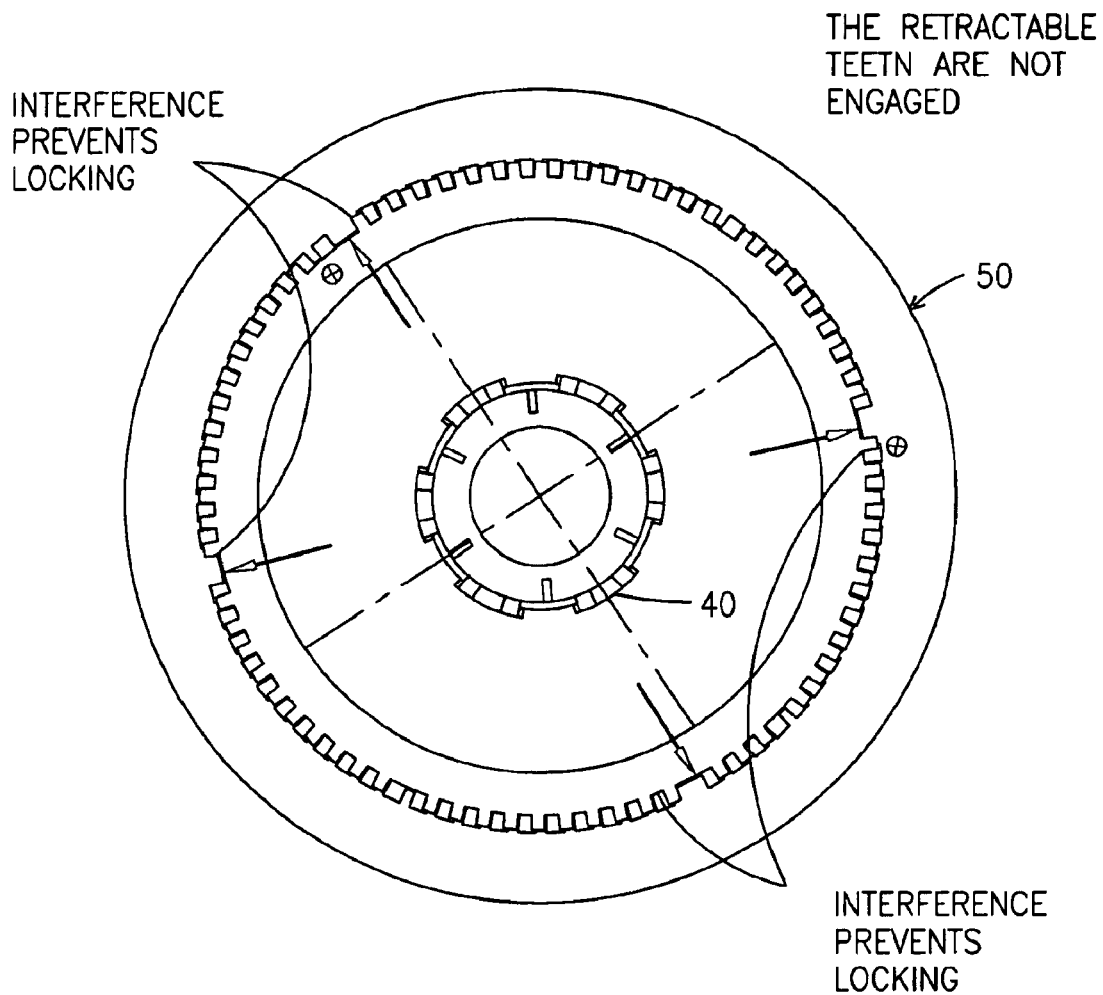
Figure 69:
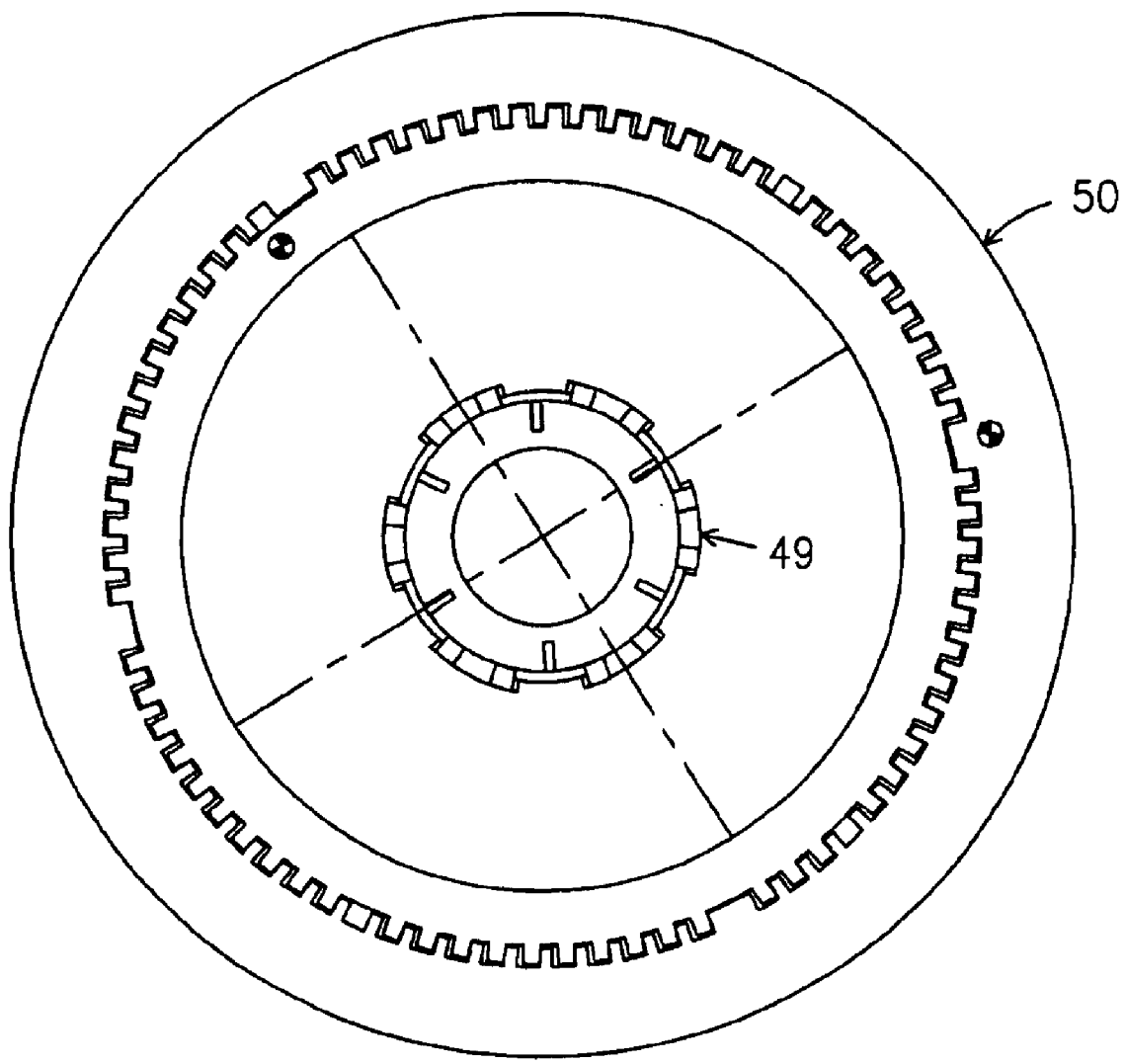
Figure 70:
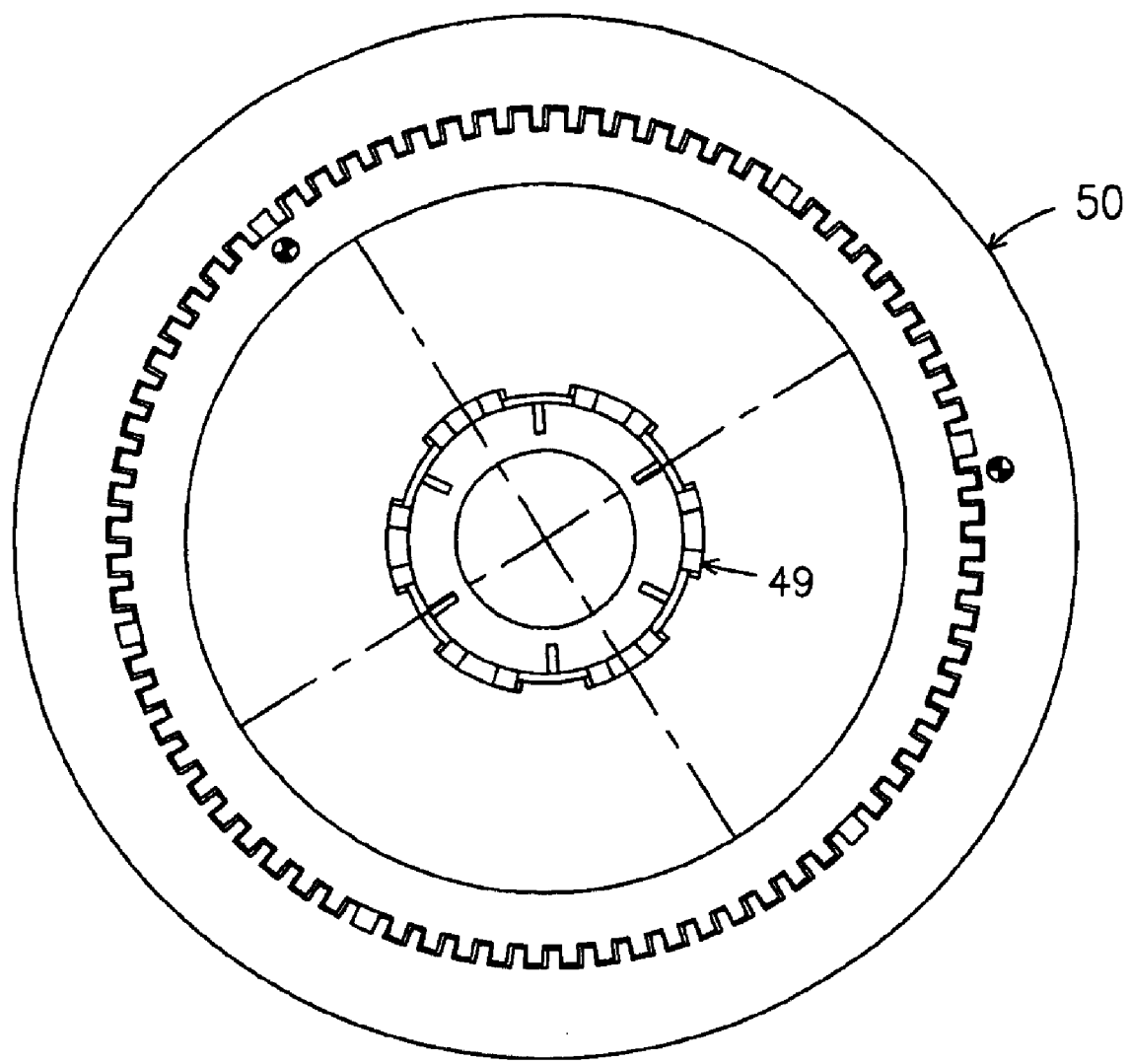
Figure 71:
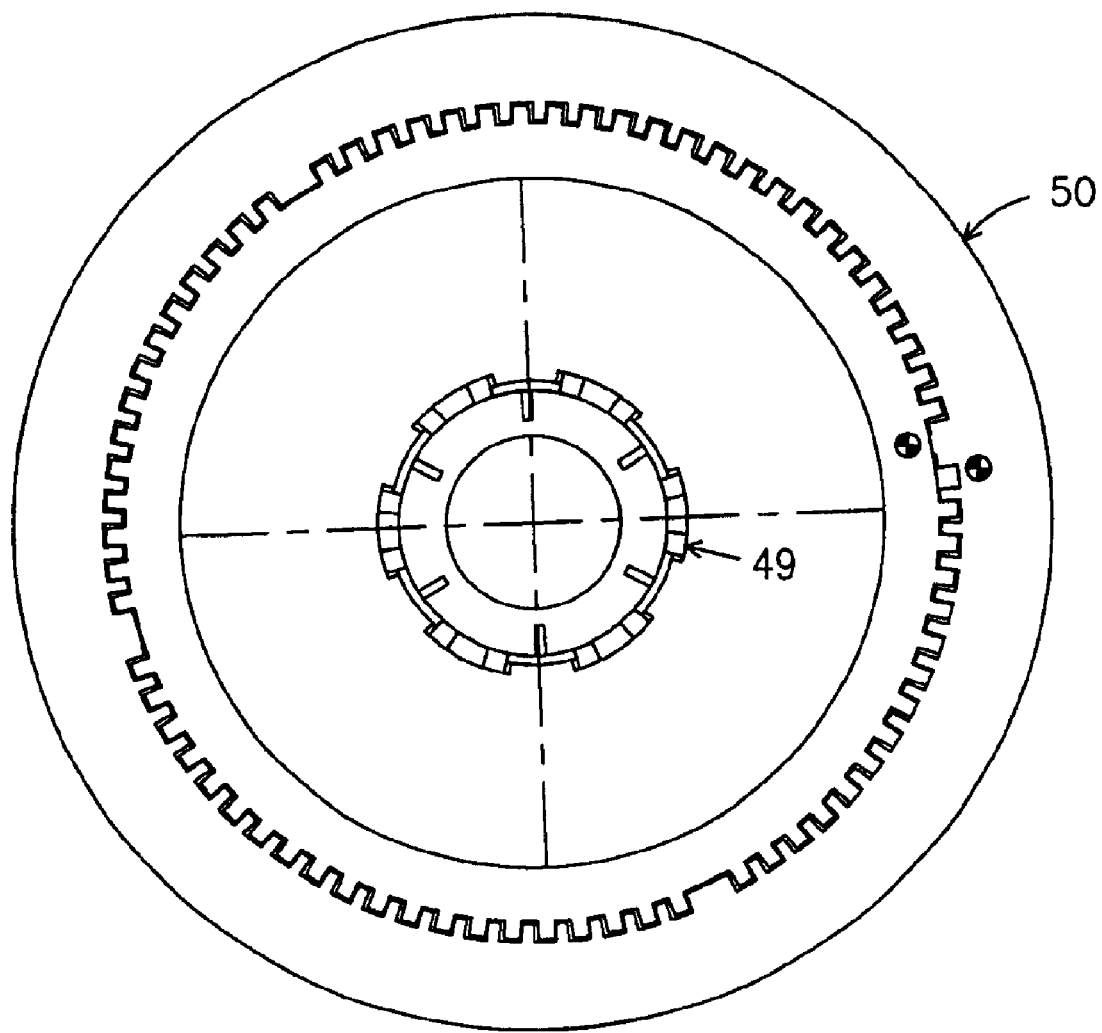

To review, for filter lockout to occur interface 40 pushes against indexing ring 80, exerting a force on retractable tooth 100. Referring now to FIGS. 66–71, a paper mock-up showing the tooth interaction of the filter shutoff mechanism is shown to better illustrate the interplay of lid teeth 51, plunger teeth 62 and indexing teeth 81 (shown in FIG. 4, for example). A starting position is shown in FIG. 66. At indexing position 49, the tooth interference shown by the arrows in FIG. 67 prevents locking of the filter mechanism. Referring to FIG. 68, at indexing position 49.5, the tooth interference shown by the arrows continues to prevent locking; as shown, for the 3-gallon water bottle of the present embodiment, retractable teeth 100 are not yet actuated. At indexing position 50 shown in FIG. 69, the tooth alignment shown by the arrows, in which plunger teeth 62 are aligned with the apertures between lid teeth 51, allowing the upward action of spring 110 to cause lockout to occur. Finally, referring now to FIGS. 70–71, retractable teeth 100 are actuated for the 2-gallon embodiment, following 75 cycles (i.e., at the 75th indexing position), and locking occurs.

Figure 54:
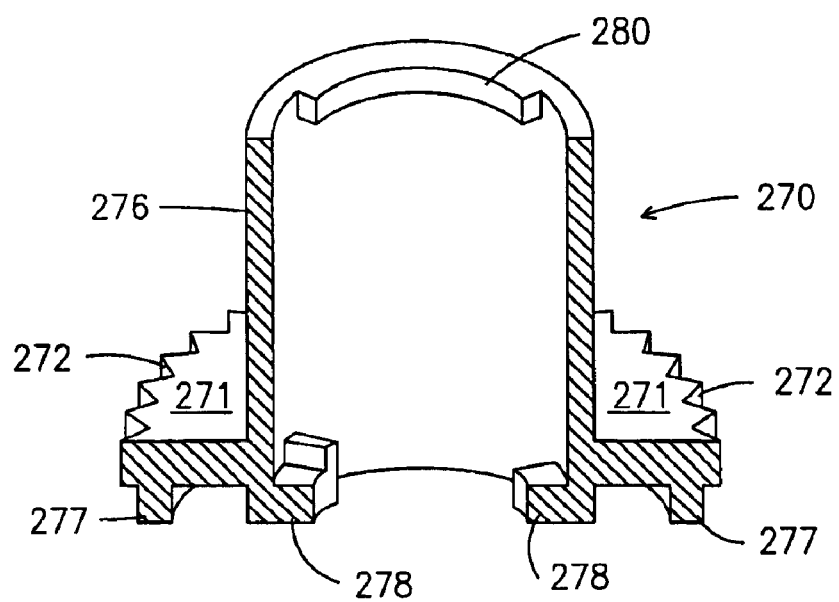
FIG. 54 is a partial sectional, partial perspective view of the indexing piece shown in FIG. 41.

Used cartridge removal will now be described. With the 2-gallon water bottle engaged, the used cartridge 260 may be rotated out by following path B and then path C as shown in FIG. 37. A new cartridge 260 may be inserted by rotating it, first along path C and then path B. Preferably, the cartridge is locked in position firmly to complete path A, using a tactile and click sound feedback, for example. With the 3-gallon water bottle engaged, while removing the cartridge by rotating it along path B, one pair of lockout arms 262 will contact resetting notches 278 on indexing piece 270, best shown in FIG. 54. This will enable indexing piece 270 to be rotated 25 indexing steps forward to indexing position 75. The cartridge may now be removed by following Path C, disengaging between lockout arms 262 and indexing piece 270. Again, a new cartridge may be rotated in, clicking firmly into locked position at Path A.

Preferred filter characteristics for use with the present invention are now described. The pressure drop and flow characteristics of a filter are influenced by basic properties of the filtering media and configuration which are presented to the contaminated fluid. A PureSmart® water filter available from Elkay Manufacturing Company, Watertech Division, of Oakbrook, Ill. utilizes a carbon-loaded, non-woven media as the primary filtering mechanism. The carbon-loaded filter media may be too restrictive to be utilized in a simple flat configuration. As a result, for use with the present invention the filter media may be combined with a support/separation media. The combined media may be pleated to increase the available surface area within the canister. Once pleated, the pleated media pack may be die-cut to the proper diameter for insertion into the canister. A retainer ring may be inserted into the canister and a sealant may be injected onto the distribution plane of the retainer. The cartridge may then be spun in place using centrifugal force at a rate effective to direct the sealant to the peripheral edge of the filter media element without wetting the filtering surface of the filter media. Sufficient sealant material is dispensed into the dispersion member of the spinning respirator cartridge assembly, forming a seal along the peripheral edge of the filter media. This seal is allowed to cure, thereby affixing the filter media to the body element of the respirator cartridge. The resulting structure exhibits a filtering surface substantially free of undesired sealant material, with the sealant perimeter-filling the void space between the internal wall of the canister and the die-cut edge of the filter media. Further details concerning the preferred filter media and process for making it are disclosed in U.S. Pat. No. 5,063,926, which is incorporated by reference in this disclosure in its entirety.

In an alternative filter arrangement, the retainer ring may be molded as an integral component of the canister or cover. A spacer may be inserted between the media pack and canister to aid in the distribution of sealant. Additional media layers may be introduced to enhance the filtering efficiency or capacity, or to increase the variety of contaminates removed.

Referring now to FIGS. 55–61, use of a preferred venting mechanism will now be described. As backround, when water bottle 20 is inverted into a dispensing position, a seal may be created between the filter shutoff mechanism lid 50 and bottle seat ledge 27*a*. To allow continuous dispensing without lock-up, air passes from outside the filter through vent holes 290 in filter lid 50 (FIGS. 55–56, or alternative embodiment FIGS. 57–58), and into water bottle 20. When the filter is initially installed on the bottle and the bottle is rotated into the functioning position, during the time that water flows down and wets and fills the filter media, the water flow path that presents the least amount of resistance, and thus the path the water actually travels, is through the vent holes. This is believed due to a water hammer effect such that the existing air already in the filter will tend to escape through these vent holes, carrying water with it. This initial condition may result in some (less than about 1 cc.) untreated water escaping through the vent holes and into the treated water. This initial condition may result in a failure to comply with NSF regulations regarding lead treatment, for example.

Figure 63:
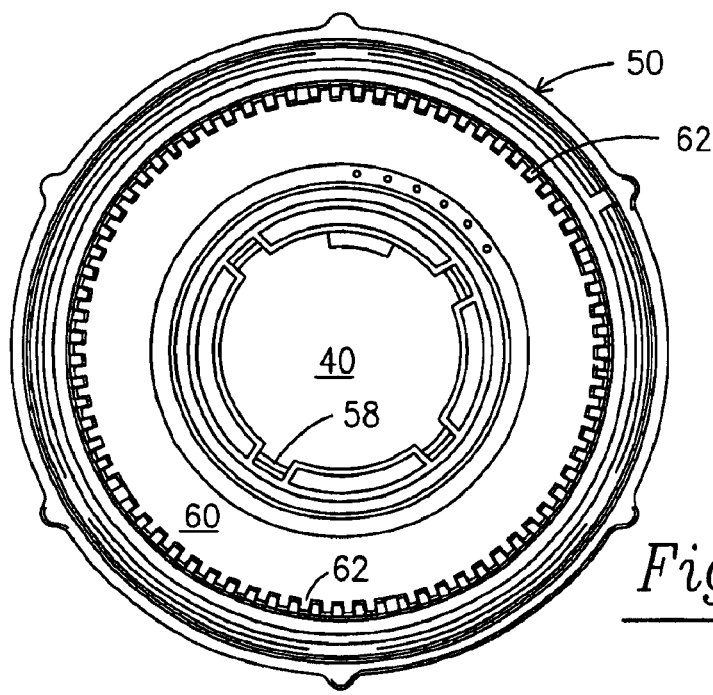
FIG. 63 is a bottom view of the components shown in FIG. 62.
Figure 65:
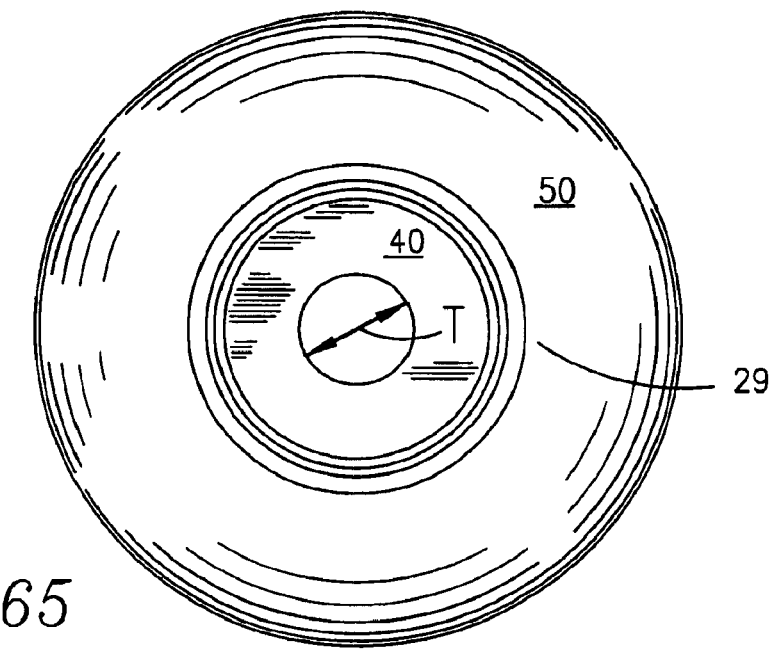
FIG. 65 is a top view of the filter cartridge showing the reduced throat thickness and vent holes.

To solve this problem, a reduced throat diameter is provided as best shown in FIGS. 62 and 63. Still referring to FIG. 63, in the preferred embodiment, six vent holes 290 are provided on the lower surface of the indexing mechanism. One preferred size of the vent holes is about 0.031 inches; however the vent holes may be sized larger, in which case fewer than six may be used. Vent holes 290 permit air to escape from and enter the filter to maintain an appropriate pressure balance, to avoid lock-up. Using this restricted throat diameter, when water bottle 20 is inverted, water slowly passes into filter shutoff device 30, such that the water level in the device slowly rises. As shown in the drawings, a convoluted flow passage through the shutoff mechanism, in conjunction with providing vent holes in the location indicated (on the same side as the side on which the water bottle handle is located, as shown in FIG. 2), results in little opportunity for water to escape and geyser out of the vent holes during filter cartridge or water bottle replacement.

In a previous embodiment disclosed in U.S. Pat. No. 6,354,344, 0.7266 minutes was required for 3500 ml. of water to flow through a filter shutoff device having a throat diameter of about ¾ inches (a fill rate of 4,817 ml./min), whereas only 0.1728 minutes was required for the same volume of water to flow through an identical filter with a throat diameter of about 1.5 inches (a fill rate of 20,255 ml./min). It was noted that water hammer continued to cause water passage through the vent holes until the fill rate was reduced below about 7,500 ml./min. Unlike prior art designs, even during the filling stage and before the water reaches its final level within the filter due to the pressure head created by the bottle neck, the water level never reaches above the level of vent holes 120. With such an improved design, water does not flow out through the vent holes, allowing NSF compliance, and reducing spillage and mess.

Figure 55:
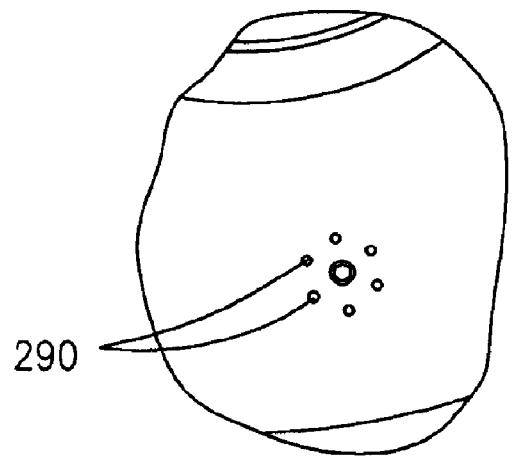
FIG. 55 is a partial perspective view of a preferred valve within the filter shutoff lid according to the present invention.
Figure 56:
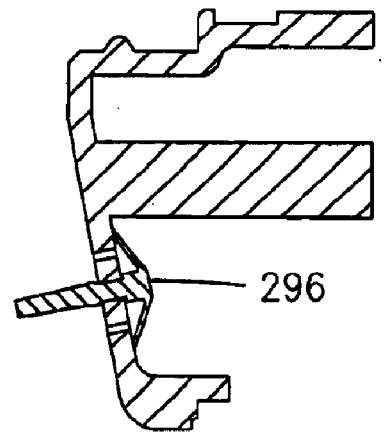
FIG. 56 is a sectional view of the valve and lid portion shown in FIG. 55.
Figure 57:
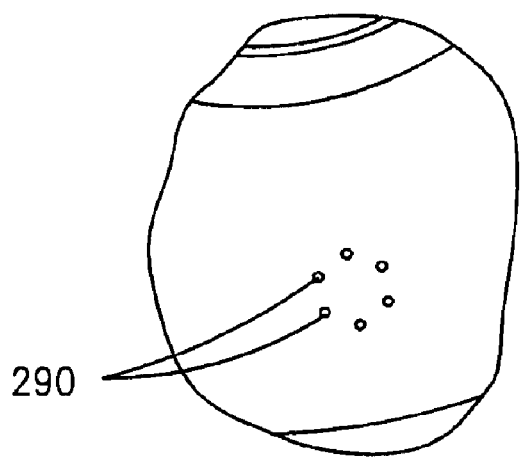
FIG. 57 is a partial perspective view of a second, alternative preferred valve within the filter shutoff lid according to the present invention.
Figure 58:
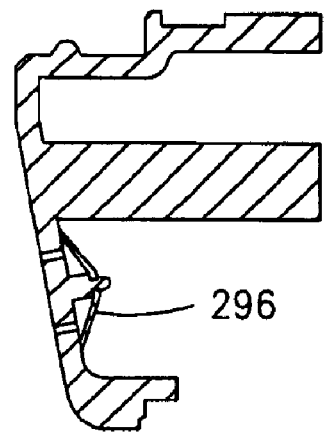
FIG. 58 is a sectional view of the valve and lid portion shown in FIG. 57.

Referring now to FIGS. 56 and 58, instead of using vent holes 290 to prevent lock-up, as shown in alternative embodiments in FIGS. 55 and 57 (though the preferred embodiment is shown in FIG. 62), two alternative embodiments using umbrella valves 296 or 298 may be used. These umbrella valves may be obtained from DaPro Rubber, Inc. of Tulsa, Okla., whose valves are molded to be stress-free throughout the convolute section with a uniform convolute thickness to +/−0.0015 inches.

As yet another alternative to that shown in FIGS. 55–58 and 62, a "duckbill" valve 300 shown in FIGS. 59 and 60 may be used, also available from DaPro Rubber. Yet another alternative is the "reed" valve 335 shown in FIGS. 59 and 61 and specially designed for this application. Air pressure opens valves 300, 335, while water pressure closes the valves. These valves allow air to enter the filter during normal operation, but prevent influent water from exiting the filter during engagement of a water bottle to the dispenser.

It will now be understood that changes in structure to components of filter dispensing assembly 30 which do not materially change the function of the assembly and which fit within the principles of the invention are intended to be covered by the following claims. For example, it will be understood that differently sized water bottles other than 2-gallon and 3-gallon water bottles may be used, with appropriately-sized necks as desired. Further, inherently understood 1 differences in structure and design may be made to the disclosed preferred embodiments shown in the drawings, while keeping within the principles of the present invention as expounded in the claims.

The above description is not intended to limit the meaning of the words used in the following claims that define the invention. Rather, it is contemplated that future modifications in structure, function or result will exist that are not substantial changes and that all such insubstantial changes are intended to be covered by the following claims. In other words, the invention is not limited to the embodiment disclosed but is of a scope defined by the following claim language which may be broadened by an extension of the right to exclude others from making, using or selling the invention as is appropriate under the doctrine of equivalents.

We claim:

1. An automatic, water dispensing, filter shutoff device including a replaceable and disposable filter, the shutoff device being in removable engagement and fluid communication with a water container and adapted to disable dispensing after a predetermined amount of dispensing, substantially corresponding with the filtration capacity of the filter, has occurred, comprising:

a monitoring and disabling apparatus having a shutoff mechanism moveable between dispensing and disabling locations, the disabling location being one in which the shutoff apparatus is placed in an interfering position with the engagement between the device and the water container;

wherein the shutoff mechanism automatically moves into the interfering position once the predetermined amount of dispensing has occurred, and without interrupting dispensing from an engaged water container; and wherein the device is capable of distinguishing between water containers having different volumetric capacities, and of moving the shutoff mechanism to the disabling location once the filtration capacity has been met, despite engagement of the device to differently-sized water containers;

whereby the used filter must first be removed and replaced with a new filter prior to reestablishing engagement and fluid communication between the shutoff device and a new water container.

2. The filter shutoff device of claim 1, wherein the device provides visual feedback to a user that filter replacement should occur.

3. The filter shutoff device of claim 1, wherein the filter comprises a filter media.

4. The filter shutoff device of claim 3, wherein the filter media comprises a carbon-loaded, non-woven media combined with pleated support media.

5. The filter shutoff device of claim 1, further comprising a semi-automatic cartridge-eject mechanism.

6. An automatic, water dispensing, filter shutoff device including a replaceable and disposable filter, the shutoff device being in removable engagement and fluid communication with a water container and adapted to disable dispensing after a predetermined amount of dispensing has occurred, comprising:

a monitoring and disabling apparatus having a shutoff mechanism moveable between dispensing and disabling locations, the disabling location being one in which the shutoff apparatus is placed in an interfering position with the engagement between the device and the water container, the monitoring and disabling apparatus including an indexing ring carrying indexing teeth, the indexing ring further comprising a retractable tooth for use in distinguishing differently-sized water containers;

wherein the shutoff mechanism automatically moves into the interfering position once the predetermined amount of dispensing has occurred, and without interrupting dispensing from an engaged water container;

whereby the used filter must first be removed and replaced with a new filter prior to reestablishing engagement and fluid communication between the shutoff device and a new water container.

7. The filter shutoff device of claim 6, wherein the shutoff mechanism comprises a plunger whose vertical height may be varied to obstruct engagement between the shutoff device and the water container.

8. The filter shutoff device of claim 7, wherein the plunger includes plunger teeth located about an outer periphery of the plunger, and the plunger also includes downwardly extending plunger teeth.

9. The filter shutoff device of claim 6, wherein the number of indexing teeth are chosen to correspond with the predetermined amount of dispensing, given volumetric capacity of the water container.

10. The filter shutoff device of claim 6, wherein the indexing ring rotates as successive water containers are used, with each incremental rotation corresponding to a single water container usage.

11. The filter shutoff device of claim 6, wherein the filter comprises a replaceable filter cartridge that is automatically ejected once the predetermined amount of dispensing has occurred, and wherein the monitoring and disabling apparatus further comprises an automatic indexing-reset mechanism such that when a used water bottle is removed from engagement with the shutoff device, the indexing ring is reset to an initial rotation position.

12. An automatic, water dispensing, filter shutoff device including a replaceable and disposable filter, the shutoff device being in removable engagement and fluid communication with a water container and adapted to disable dispensing after a predetermined amount of dispensing has occurred, the filter comprising a replaceable filter cartridge that is automatically ejected once the predetermined amount of dispensing has occurred, comprising:

a monitoring and disabling apparatus having a shutoff mechanism moveable between dispensing and disabling locations, the disabling location being one in which the shutoff apparatus is placed in an interfering position with the engagement between the device and the water container;

wherein the shutoff mechanism automatically moves into the interfering position once the predetermined amount of dispensing has occurred, and without interrupting dispensing from an engaged water container;

whereby the used filter must first be removed and replaced with a new filter prior to reestablishing engagement and fluid communication between the shutoff device and a new water container.

13. An automatic, water dispensing, filter shutoff device including a replaceable and disposable filter, the shutoff device being in removable engagement and fluid communication with a water container and adapted to disable dispensing after a predetermined amount of dispensing has occurred, comprising:

a valve mechanism allowing air to enter the shutoff device during water dispensing, and preventing water from exiting the filter during engagement of a water container to the shutoff device; and a monitoring and disabling apparatus having a shutoff mechanism moveable between dispensing and disabling locations, the disabling location being one in which the shutoff apparatus is placed in an interfering position with the engagement between the device and the water container;

wherein the shutoff mechanism automatically moves into the interfering position once the predetermined amount of dispensing has occurred, and without interrupting dispensing from an engaged water container;

whereby the used filter must first be removed and replaced with a new filter prior to reestablishing engagement and fluid communication between the shutoff device and a new water container.

14. The filter shutoff device of claim 13, wherein the valve mechanism comprises two or more valves.

15. An automatic, water dispensing, filter shutoff device having a disposable and replaceable filter, the shutoff device being in removable engagement and fluid communication with a water container and adapted to disable dispensing after a predetermined amount of dispensing has occurred, comprising:

a monitoring and disabling apparatus comprising shutoff means moveable between dispensing and disabling locations, the disabling location being one in which the shutoff means is placed in an interfering position with the engagement between the shutoff device and the water container;

wherein the shutoff means automatically moves into the interfering position once the predetermined amount of dispensing has occurred, and without interrupting dispensing from an engaged water container, whereby the used filter must first be removed and replaced with a new filter prior to reestablishing engagement and fluid communication between the shutoff device and a new water container; and wherein the filter comprises a filter cartridge and a semi-automatic cartridge-eject mechanism, whereby the replaceable filter is automatically ejected once the predetermined amount of dispensing has occurred, and wherein the ejection process triggers resetting of the shutoff means.

16. The filter shutoff device of claim 15, wherein the shutoff means includes a plunger and rotating indexing means, and wherein when a used water bottle is removed from engagement with the shutoff device, the rotating indexing means is reset to an initial rotation position.

* * * * *